(12) United States Patent
Lee et al.

(10) Patent No.: US 11,923,797 B2
(45) Date of Patent: Mar. 5, 2024

(54) MOTOR DRIVING DEVICE AND AIR CONDITIONER INCLUDING THE SAME

(71) Applicant: LG Electronics Inc., Seoul (KR)

(72) Inventors: Yonghwa Lee, Seoul (KR); Songhee Yang, Seoul (KR); Jeongeon Oh, Seoul (KR)

(73) Assignee: LG Electronics Inc., Seoul (KR)

( * ) Notice: Subject to any disclaimer, the term of this patent is extended or adjusted under 35 U.S.C. 154(b) by 55 days.

(21) Appl. No.: 17/574,879

(22) Filed: Jan. 13, 2022

(65) Prior Publication Data

US 2022/0224276 A1 Jul. 14, 2022

(30) Foreign Application Priority Data

Jan. 13, 2021 (KR) .................. 10-2021-0004777

(51) Int. Cl.
*H02P 27/08* (2006.01)
*F24F 1/20* (2011.01)
*H02P 29/028* (2016.01)

(52) U.S. Cl.
CPC .............. *H02P 29/028* (2013.01); *F24F 1/20* (2013.01); *H02P 27/085* (2013.01)

(58) Field of Classification Search
CPC ...... H02P 29/028; H02P 27/08; H02P 27/085; H02P 27/06; H02P 25/184; H02P 21/22; H02P 25/18
See application file for complete search history.

(56) References Cited

U.S. PATENT DOCUMENTS

| 8,390,221 | B2* | 3/2013 | Jayanth | H02H 7/0852 |
| | | | | 361/22 |
| 2002/0070716 | A1* | 6/2002 | Gupta | H02P 9/48 |
| | | | | 322/29 |
| 2015/0168033 | A1* | 6/2015 | Yamakawa | H02P 27/02 |
| | | | | 62/324.6 |
| 2019/0245470 | A1* | 8/2019 | Nigo | F24F 11/85 |
| 2019/0245471 | A1* | 8/2019 | Nigo | H02K 3/28 |
| 2020/0252017 | A1* | 8/2020 | Takayama | H02P 25/184 |

FOREIGN PATENT DOCUMENTS

| EP | 3651352 | 5/2020 |
| EP | 3660409 | 7/2020 |
| KR | 20200007045 | 1/2020 |
| KR | 20200112505 | 10/2020 |
| KR | 20190040288 | 5/2021 |

OTHER PUBLICATIONS

Office Action in Korean Appln. No. 10-2021-0004777, dated Apr. 26, 2022, 15 pages (with English translation).
Extended European Search Report in European Appln. No. 22150865.8, dated Jun. 1, 2022, 8 pages.

* cited by examiner

*Primary Examiner* — Rina I Duda
(74) *Attorney, Agent, or Firm* — Fish & Richardson P.C.

(57) ABSTRACT

A motor driving device and an air conditioner having the same of the present disclosure limits the switching of a winding switching device when there is a possibility that the winding switching device is deteriorated, in order to increase the life of winding switching device of a motor and prevent malfunction.

17 Claims, 25 Drawing Sheets

(a)

(b)

|  | UPhase | VPhase | WPhase |
|---|---|---|---|
| Y Winding resistance | 0.96 | 0.96 | 0.97 |
| Δ Winding resistance | 0.41 | 0.42 | 0.42 |
| Y/Δ Ratio | 2.3 | 2.3 | 2.3 |

|  | UPhase | VPhase | WPhase |
|---|---|---|---|
| Y Winding resistance | 0.97 | 0.97 | 0.97 |
| Δ Winding resistance | 0.71 | 0.41 | 0.72 |
| Y/Δ Ratio | 1.4 | 2.4 | 1.4 |

(a)

(b)

| | UPhase | VPhase | WPhase |
|---|---|---|---|
| Y Winding resistance | 1.23 | 0.48 | 0.67 |
| Δ Winding resistance | 0.40 | 0.40 | 0.40 |
| Y/Δ Ratio | 3.1 | 1.2 | 1.7 |

(b)

|  | UPhase | VPhase | WPhase |
|---|---|---|---|
| Y Winding resistance | 0.68 | 0.68 | 0.41 |
| Δ Winding resistance | 0.40 | 0.40 | 0.41 |
| Y/Δ Ratio | 1.7 | 1.7 | 1.0 |

(b)

|  | UPhase | VPhase | WPhase |
|---|---|---|---|
| Y Winding resistance | 0.39 | 0.41 | 0.41 |
| Δ Winding resistance | 0.40 | 0.40 | 0.41 |
| Y/Δ Ratio | 0.98 | 1.0 | 1.0 |

(a)

(b)

MOTOR DRIVING DEVICE AND AIR CONDITIONER INCLUDING THE SAME

CROSS-REFERENCE TO RELATED APPLICATIONS

This application claims the benefit of Korean Patent Application No. 10-2021-0004777, filed on Jan. 13, 2021. The disclosure of the prior application is incorporated by reference in its entirety.

TECHNICAL FIELD

The present disclosure relates to a motor driving device and an air conditioner having the same, and more particularly, to a motor driving device for preventing failure of a device for switching winding of a motor, and an air conditioner having the same.

BACKGROUND

An air conditioner is installed to provide a more comfortable indoor environment to humans by discharging hot and cold air into the room to create a comfortable indoor environment, controlling the indoor temperature, and purifying the indoor air. In general, the air conditioner includes an indoor unit configured of a heat exchanger and installed indoors, and an outdoor unit which is configured of a compressor, a heat exchanger, and the like and supplies a refrigerant to the indoor unit.

Meanwhile, in order to increase a power conversion efficiency or motor driving efficiency when a compressor motor is driven in the compressor, International Patent Application Publication WO19-008756 (hereinafter referred to as 'prior document') discloses a switching device that converts the winding of the motor into Y connection and Δ connection.

However, according to the prior document, in order to convert the winding of the motor into Y connection or Δ connection, as a switching device, a mechanical or electrical switch is required, and due to a repeated use of such a switch, it may be damaged or the lifespan may be deteriorated.

SUMMARY

The present disclosure has been made in view of the above problems, and provides a motor driving device for limiting switching of a winding switching device, when there is a possibility that the winding switching device is deteriorated, in order to prolong the life of the winding switching device of a motor and to prevent failure, and an air conditioner having the same.

The present disclosure further provides a motor driving device capable of determining whether there is an abnormality in a switching device for converting a motor connection, and an air conditioner having the same.

The present disclosure further provides a motor driving device capable of determining whether a switching device is abnormal based on the winding resistance in a first connection and the winding resistance in a second connection according to the operation of the switching device, and an air conditioner having the same.

The present disclosure further provides a motor driving device capable of increasing power conversion efficiency or motor driving efficiency when a switching device operates normally, and an air conditioner having the same.

The present disclosure further provides a motor driving device capable of operating a switching device by one of a first connection or a second connection when the switching device is abnormal, and an air conditioner having the same.

The present disclosure further provides a motor driving device capable of determining whether a motor is faulty, and an air conditioner having the same.

The present disclosure is characterized in that the switching of a switching device is limited in a situation where the windings are required to be repeatedly switched.

In detail, a motor driving device and an air conditioner having the same according to an embodiment of the present disclosure includes: an inverter configured to be provided with a plurality of switching devices, and to output AC power to a motor based on a switching operation; a switching device configured to be disposed between the inverter and the motor, and to convert a winding of the motor into a first connection or a second connection; and a controller configured to control the inverter and the switching device, wherein the controller limits a connection conversion of the winding of the motor, when the number of low-speed abnormal operation in which an operation frequency of the motor is operated at a limit frequency or lower exceeds a first threshold value within a certain time, in the second connection state.

The controller permits a connection conversion of the motor winding, after a first time is elapsed, in a state in which a conversion of connection state of the motor winding is limited.

The controller initializes an accumulated value for the number of times of the low-speed abnormal operation, after a first time is elapsed, in a state in which a conversion of connection state of the motor winding is limited.

In addition, the present disclosure further includes an output current detection unit for detecting the output current output from the inverter, wherein at the limit frequency, an output current value in the first connection state is smaller than an output current value in the second connection state.

At the limit frequency, the output current value in the first connection state is smaller than 1/sqrt(3) times a maximum value of the output current in the second connection state.

The controller controls the winding of the motor to be in the first connection state, when the operation frequency of the motor is lower than or equal to a first operation frequency.

The controller controls the winding of the motor to be in the second connection state, when the operation frequency of the motor exceeds a first operation frequency.

The controller controls the motor to operate continuously without stopping the motor, while the winding of the motor is converted from the first connection to the second connection.

The controller converts the winding of the motor into the first connection or the second connection according to the operation frequency of the motor, when the number of low-speed abnormal operation in which the operation frequency of the motor is operated at the limit frequency or lower is less than the first threshold value within a certain time, in the second connection state.

The controller converts the winding of the motor into the first connection or the second connection according to the operation speed of the motor, when the number of low-speed abnormal operation in which the operation frequency of the motor is operated at the limit frequency or lower is less than the first threshold value within a certain time, in the second connection state.

The controller controls the winding of the motor to be in the first connection state, when the operation frequency of the motor is lower than or equal to a first speed.

The controller controls the winding of the motor to be in the second connection state, when the operation frequency of the motor exceeds a first speed.

In addition, the present disclosure further includes an output current detection unit that detects an output current output from the inverter, wherein the controller, according to a switching device check mode, controls the inverter to output an output current of a first level in a state in which the winding of the motor is in the first connection state according to an operation of the switching device, during a first period, and controls the inverter to output the output current of the first level in a state in which the winding of the motor is in the second connection according to the operation of the switching device, during a second period after the first period.

The controller determines whether the switching device operates abnormally, based on a winding resistance of the motor in the first connection and a winding resistance of the motor in the second connection.

The controller calculates the first winding resistance and the second winding resistance for each phase, determines as a failure of the motor, when a range of the first winding resistance for each phase deviates from a first range and a range of the second winding resistance for each phase deviates from a second range, determines that the switching device is normal, when the range of the first winding resistance for each phase is within the first range, and the range of the second winding resistance for each phase is within the second range, and controls the switching device to convert the winding of the motor from the first connection to the second connection according to the operation frequency of the motor.

Meanwhile, another embodiment of the present disclosure includes an inverter configured to be provided with a plurality of switching devices, and to output AC power to a motor based on a switching operation; a switching device configured to be disposed between the inverter and the motor, and to convert a winding of the motor into a first connection or a second connection; and a controller configured to control the inverter and the switching device, wherein the controller maintains the second connection, when the number of low-speed abnormal operation in which an operation frequency of the motor is operated at a limit frequency or lower exceeds a first threshold value within a certain time, in a state in which the winding of the motor is in the second connection.

BRIEF DESCRIPTION OF THE DRAWINGS

The above and other objects, features and advantages of the present disclosure will be more apparent from the following detailed description in conjunction with the accompanying drawings, in which.

DETAILED DESCRIPTION

Hereinafter, the present disclosure will be described in more detail with reference to the drawings.

The suffixes "module" and "unit" in elements used in description below are given only in consideration of ease in preparation of the specification and do not have specific meanings or functions. Therefore, the suffixes "module" and "unit" may be used interchangeably.

Figure 1:
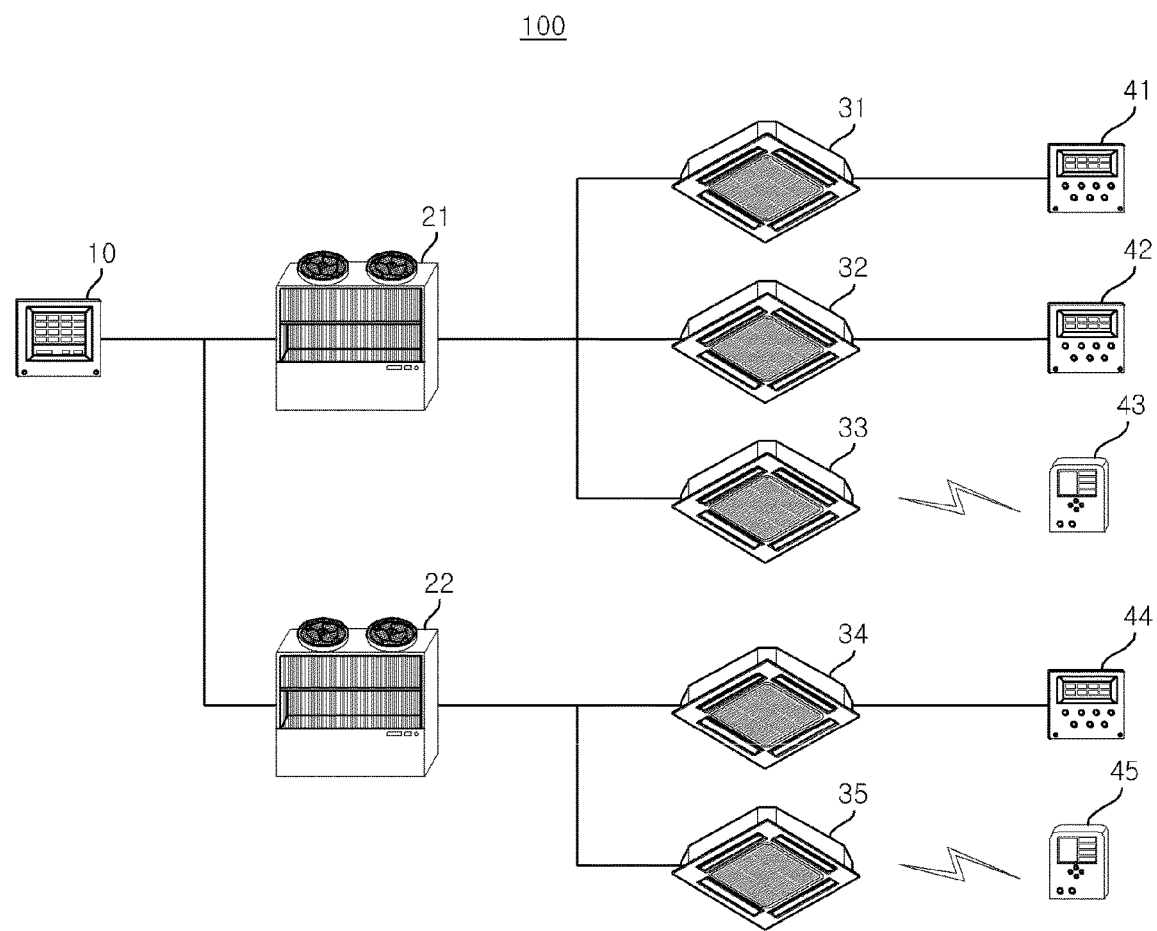
FIG. 1 is a diagram illustrating the configuration of an air conditioner according to an embodiment of the present disclosure.

FIG. 1 is a diagram illustrating the configuration of an air conditioner according to an embodiment of the present disclosure.

As shown in FIG. 1, the air conditioner according to the present disclosure is a large-sized air conditioner 100, and may include a plurality of indoor units 31 to 35, a plurality of outdoor units 21 and 22 connected to the plurality of indoor units, a remote controller 41 to 45 connected to each of the plurality of indoor units, and a remote controller 10 for controlling the plurality of indoor units and outdoor units.

The remote controller 10 is connected to the plurality of indoor units 31 to 36 and the plurality of outdoor units 21 and 22 to monitor and control operations thereof. In this case, the remote controller 10 may be connected to the plurality of indoor units to perform operation setting, lock setting, schedule control, group control, and the like for the indoor units.

The air conditioner 100 may be any one of a stand-type air conditioner, a wall-mounted air conditioner, and a ceiling-type air conditioner. However, for convenience of description, a ceiling-type air conditioner will be described below as an example.

In addition, the air conditioner may further include at least one of a ventilator, an air purifier, a humidifier, and a heater, and may operate in conjunction with the operation of the indoor unit and the outdoor unit.

The outdoor unit 21, 22 includes a compressor (not shown) that receives and compresses a refrigerant, an outdoor heat exchanger (not shown) that exchanges heat between the refrigerant and the outdoor air, an accumulator (not shown) that extracts a gaseous refrigerant from the supplied refrigerant and supplies to the compressor, and a four-way valve (not shown) that selects a flow path of the refrigerant according to the heating operation. In addition, a plurality of sensors, a valve, and an oil recovery device are further included, but a description of the configuration thereof will be omitted below.

The outdoor unit 21, 22 operates the provided compressor and outdoor heat exchanger to compress or heat-exchange refrigerant according to a setting, thereby supplying the refrigerant to the indoor unit 31, 35. The outdoor unit 21, 22 is driven by the request of the remote controller 10 or the indoor unit 31, 35 and, as the cooling/heating capacity varies in response to the driven indoor unit, the number of operations of outdoor units and the number of operations of compressors installed in the outdoor unit are variable.

In this case, the outdoor unit 21, 22 is described on the basis that the plurality of outdoor units supply refrigerant to the connected indoor units respectively. However, according to the connection structure of the outdoor unit and the indoor unit, a plurality of outdoor units may be interconnected to supply a refrigerant to the plurality of indoor units.

The indoor unit 31, 35 is connected to any one of the plurality of outdoor units 21 and 22, receive refrigerant, and discharge hot and cold air into the room. The indoor unit 31, 35 include an indoor heat exchanger (not shown), an indoor unit fan (not shown), an expansion valve (not shown) through which the supplied refrigerant is expanded, and a plurality of sensors (not shown).

At this time, the outdoor units 21 and 22 and the indoor units 31 to 35 are connected by a communication line to transmit and receive data each other, and the outdoor unit and the indoor unit are connected to the remote controller 10 through a separate communication line and operate according to the control of the remote controller 10.

The remote controllers 41 to 45 may be respectively connected to the indoor unit, input a user's control command to the indoor unit, and receive and display state information of the indoor unit. In this case, the remote controller communicates by wire or wirelessly depending on the connection type with the indoor unit, and in some cases, one remote controller is connected to a plurality of indoor units, and settings of the plurality of indoor units may be changed through a single input of remote controller.

In addition, the remote controllers 41 to 45 may include a temperature sensor therein.

Figure 2:
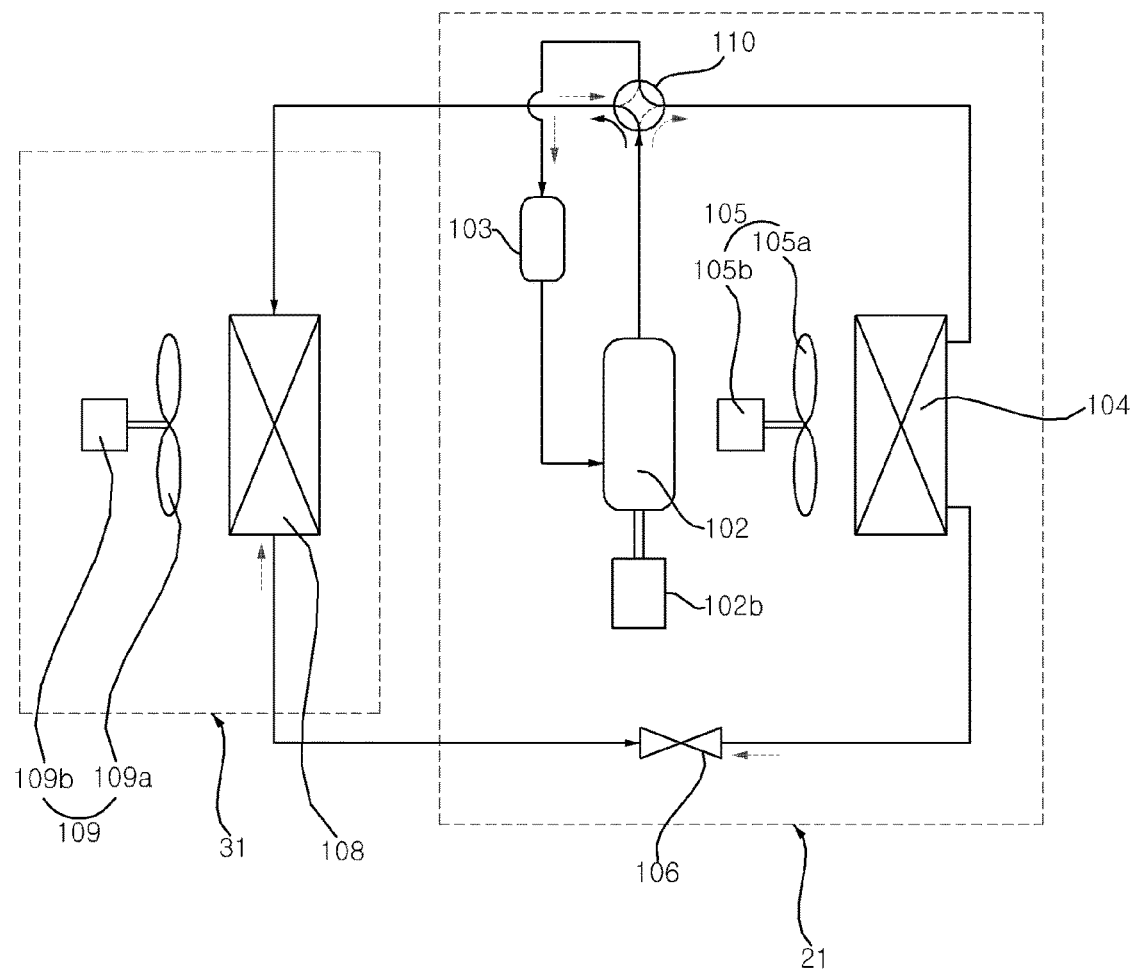
FIG. 2 is a schematic diagram of an outdoor unit and an indoor unit of FIG. 1.

FIG. 2 is a schematic diagram of an outdoor unit and an indoor unit of FIG. 1.

Referring to the drawing, the air conditioner 100 is mainly divided into an indoor unit 31 and an outdoor unit 21.

The outdoor unit 21 includes a compressor 102 serving to compress a refrigerant, a compressor electric motor 102b for driving the compressor, an outdoor heat exchanger 104 serving to dissipate heat from the compressed refrigerant, an outdoor blower 105 including an outdoor fan 105a disposed in one side of the heat exchanger 104 to promote heat dissipation of the refrigerant and an electric motor 105b rotating the outdoor fan 105a, an expansion valve 106 expanding the condensed refrigerant, a cooling/heating switching valve 110 for changing the flow path of the compressed refrigerant, and an accumulator 103 for temporarily storing the vaporized refrigerant to remove moisture and foreign substances and then supplying the refrigerant of a constant pressure to the compressor.

The indoor unit 31 includes an indoor heat exchanger 108 disposed indoors to perform a cooling/heating function, and an indoor blower 109 including an indoor fan 109a disposed in one side of the indoor heat exchanger 108 to promote heat dissipation of the refrigerant, and an electric motor 109b that rotates the indoor fan 109a.

At least one indoor heat exchanger 108 may be installed. At least one of an inverter compressor and a constant speed compressor may be used as the compressor 102.

In addition, the air conditioner 100 may be configured as an air conditioner for cooling the room, or may be configured as a heat pump for cooling or heating the room.

Meanwhile, although FIG. 2 shows one indoor unit 31 and one outdoor unit 21, the driving device of the air conditioner according to the embodiment of the present disclosure is not limited thereto, and obviously, it is applicable to a multi-type air conditioner having a plurality of indoor units and outdoor units and an air conditioner having one indoor unit and a plurality of outdoor units.

The compressor 102 in the outdoor unit 21 of FIG. 1 may be driven by a motor driving device 220 for driving a compressor that drives the compressor motor 230.

Figure 3:
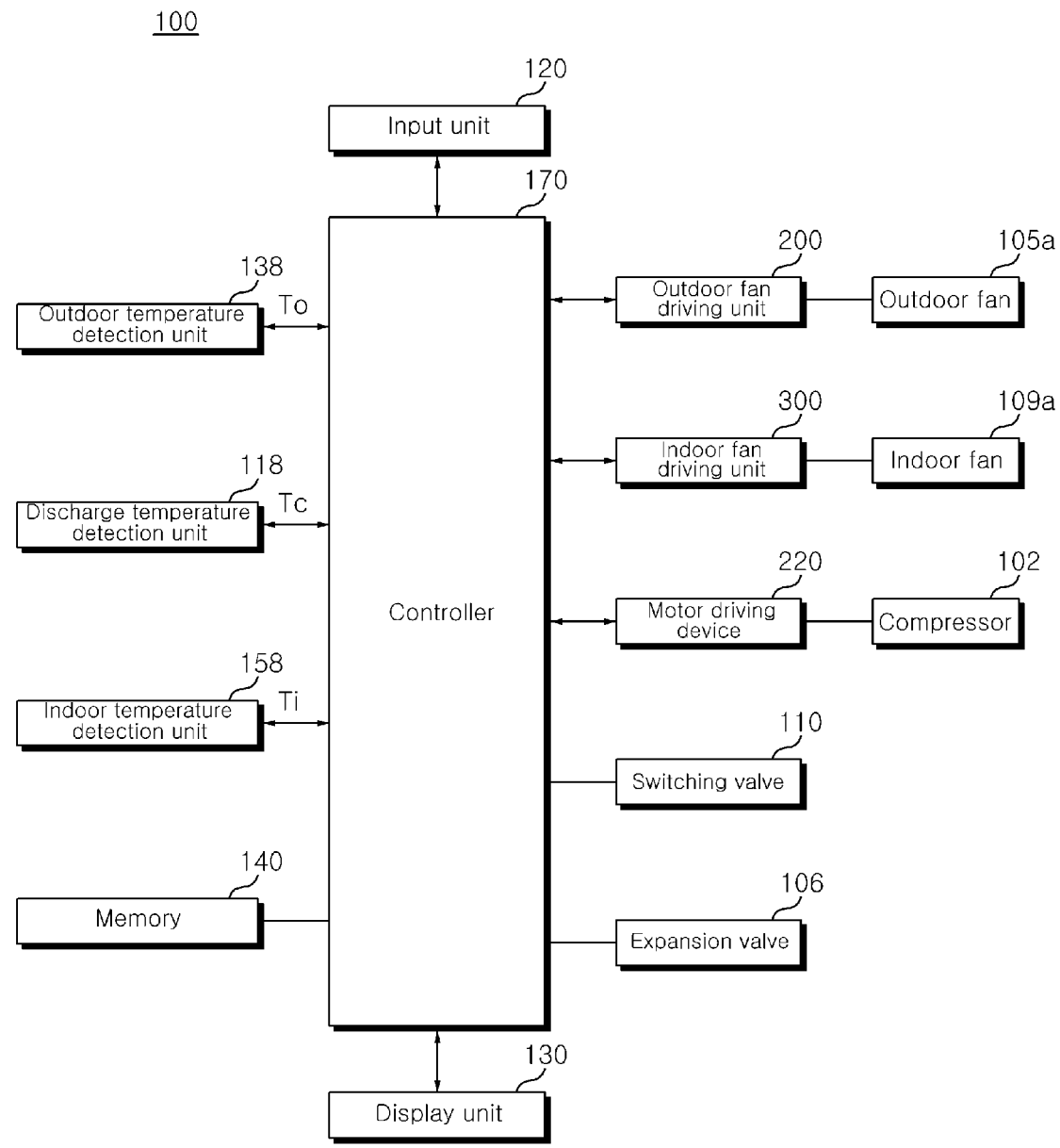
FIG. 3 is a simplified internal block diagram of the air conditioner of FIG. 1.

FIG. 3 is a simplified internal block diagram of the air conditioner of FIG. 1.

Referring to the drawing, the air conditioner 100 of FIG. 3 includes a compressor 102, an outdoor fan 105a, an indoor fan 109a, a controller 170, a discharge temperature detection unit 118, an outdoor temperature detection unit 138, an indoor temperature detection unit 158, and a memory 140.

In addition, the air conditioner 100 may further include a motor driving device 220, an outdoor fan driving unit 200, an indoor fan driving unit 300, a switching valve 110, an expansion valve 106, a display unit 130, and an input unit 120.

Description of the compressor 102, the outdoor fan 105a, and the indoor fan 109a refer to FIG. 2.

The input unit 120 includes a plurality of operation buttons, and transmits an input signal for the target operating temperature of the air conditioner 100 to the controller 170.

The display unit 130 may display the operating state of the air conditioner 100.

The memory 140 may store data necessary for the operation of the air conditioner 100.

The discharge temperature detection unit 118 may detect a refrigerant discharge temperature Tc in the compressor 102, and may transmit a signal for the detected refrigerant discharge temperature Tc to the controller 170.

The outdoor temperature detection unit 138 may detect an outdoor temperature To, which is a temperature around the outdoor unit 21 of the air conditioner 100, and transmit a signal for the detected outdoor temperature To to the controller 170.

The indoor temperature detection unit 158 may detect an indoor temperature Ti, which is a temperature around the indoor unit 31 of the air conditioner 100, and transmit a signal for the detected indoor temperature Ti to the controller 170.

The controller 170 may control the air conditioner 100 based on an input target temperature and at least one of the detected refrigerant discharge temperature Tc, the detected outdoor temperature To, and the detected indoor temperature Ti. For example, the controller 170 may control the air conditioner 100 to operate by calculating a final target degree of superheat.

Meanwhile, as shown in the drawing, for controlling the operation of the compressor 102, the indoor fan 109a, and the outdoor fan 105a, the controller 170 may control each of the motor driving device 220, the outdoor fan driving unit 200, and the indoor fan driving unit 300.

For example, the controller 170 may output a corresponding speed command value signal to the motor driving device 220, the outdoor fan driving unit 200, or the indoor fan driving unit 300, based on a target temperature.

In addition, a compressor motor (not shown), the motor 230, and the indoor fan motor 109*b* may be operated at a target rotation speed respectively, based on respective speed command value signals.

Meanwhile, the controller 170 may control the overall operation of the air conditioner 100, in addition to controlling the motor driving device 220, the outdoor fan driving unit 200, or the indoor fan driving unit 300.

For example, the controller 170 may control the operation of the cooling/heating switching valve 110 or the four-way valve.

Alternatively, the controller 170 may control the operation of the expansion mechanism or the expansion valve 106.

Figure 4:
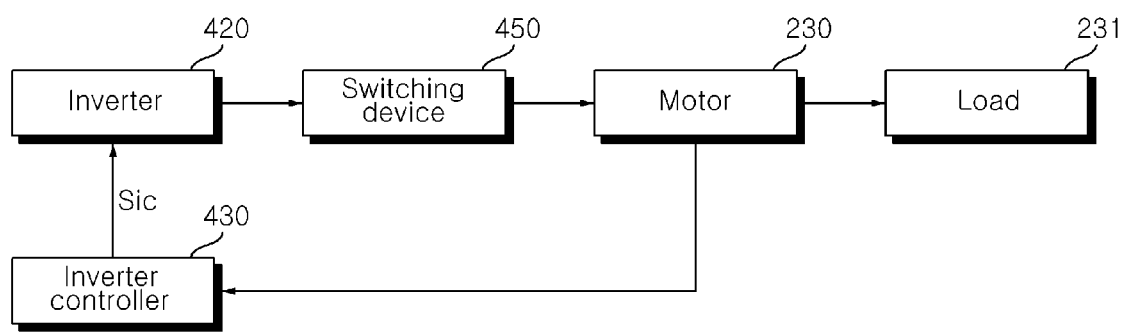
FIG. 4 illustrates an example of an internal block diagram of a motor driving device according to an embodiment of the present disclosure.
Figure 5:
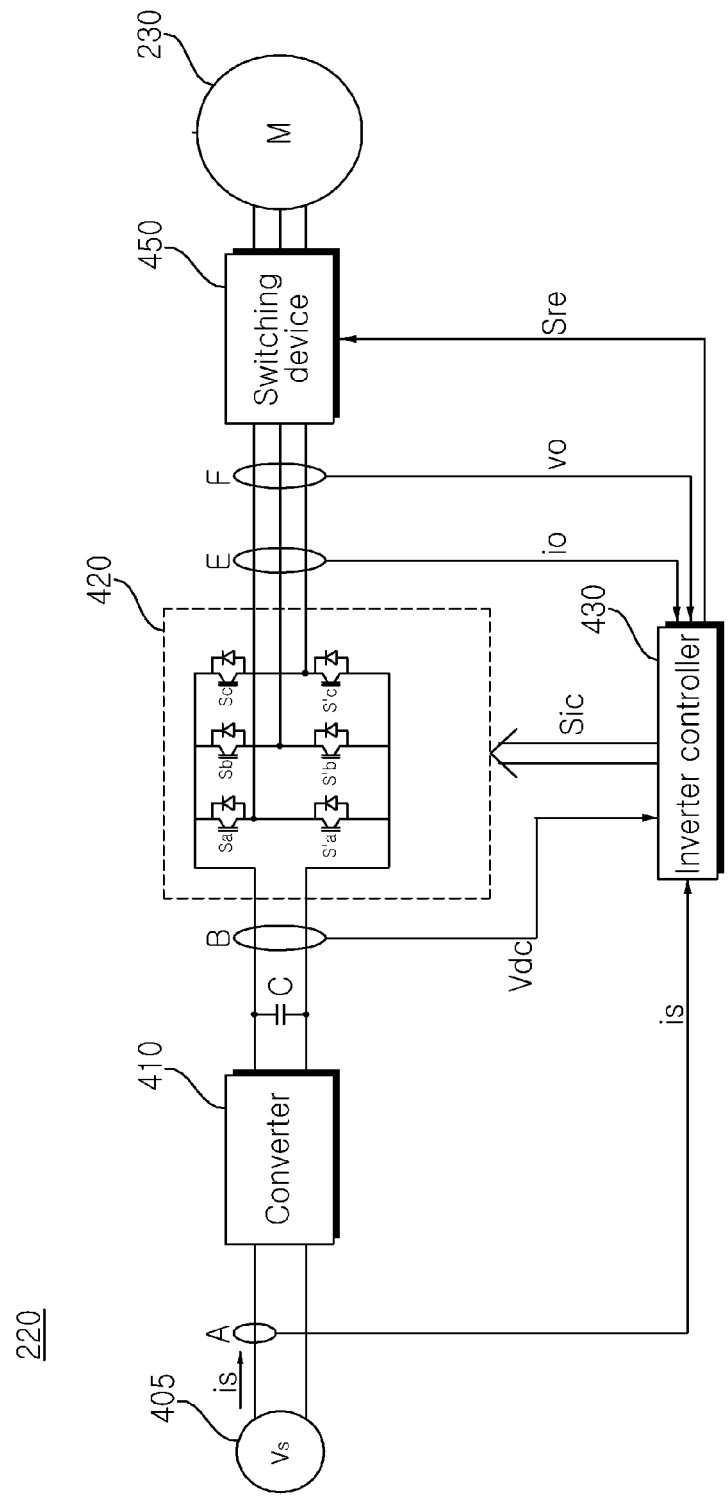
FIG. 5 is an example of an internal circuit diagram of the motor driving device of FIG. 4.

FIG. 4 illustrates an example of an internal block diagram of a motor driving device according to an embodiment of the present disclosure, and FIG. 5 is an example of an internal circuit diagram of the motor driving device of FIG. 4.

Referring to the drawings, the motor driving device 220 according to the embodiment of the present disclosure is implemented to drive the motor by a sensorless method, and may be referred to as a power conversion device.

The motor driving device 220 according to the embodiment of the present disclosure may include a converter 410, an inverter 420, an inverter controller 430, a switching device 450, a DC terminal voltage detection unit B, a DC terminal capacitor C, an output current detection unit E, and an output voltage detection unit F. In addition, the motor driving device 220 may further include an input current detection unit A, and the like.

The input current detection unit A may detect an input current $i_s$ that is input from a commercial AC power 405. To this end, as the input current detection unit A, a current transformer CT, a shunt resistor, or the like may be used. The detected input current $i_s$ may be input to the inverter controller 430 as a discrete signal in the form of a pulse.

The converter 410 converts the commercial AC power 405 that has passed through a reactor L into a DC power and outputs it. Although the drawing shows the commercial AC power 405 as a three-phase AC power, it may be a single-phase AC power. The internal structure of the converter 410 also varies depending on the type of the commercial AC power 405.

Meanwhile, the converter 410 may be made of a diode, or the like without a switching device, and may perform a rectification operation without a separate switching operation.

For example, in the case of a three-phase AC power, the converter 410 may include six diodes in the form of a bridge, and in the case of a single-phase AC, the converter 410 may include four diodes in the form of a bridge.

Meanwhile, in the case of a three-phase AC power, the converter 410 may include six switching devices and six diodes, and in the case of a single-phase AC power, may be a half-bridge type converter including two switching devices and four diodes.

When the converter 410 includes a switching device, a step-up operation, a power factor improvement, and a DC power conversion may be performed by a switching operation of a corresponding switching device.

A DC terminal capacitor C is disposed in a DC terminal and stores power output from the converter 410. In the drawing, one device is exemplified as the DC terminal capacitor C, but a plurality of devices may be provided to ensure device stability.

Meanwhile, in the drawing, it is illustrated that the DC terminal capacitor C is connected to the output terminal of the converter 410, but the present disclosure is not limited thereto, and DC power may be directly inputted.

For example, DC power from a solar cell may be directly input to the DC terminal capacitor C, or may be input through DC/DC conversion. Hereinafter, a part illustrated in the drawing will be mainly described.

Meanwhile, since DC power is stored in both ends of the DC terminal capacitor C, the both ends of the DC terminal capacitor C may be referred to as a DC terminal or a DC link terminal.

A DC terminal voltage detection unit B may detect the DC terminal voltage Vdc, which is both ends of the DC terminal capacitor C. To this end, the DC terminal voltage detection unit B may include a resistance element, an amplifier, and the like. The detected DC terminal voltage Vdc may be input to the inverter controller 430 as a discrete signal in the form of a pulse.

The inverter 420 includes a plurality of inverter switching devices (Sa to Sc, S'a to S'c), converts the DC power Vdc of the DC terminal to a three-phase AC power va, vb, vc by the turn-on/off operation of the switching device, and output to the three-phase synchronous motor 230.

The inverter 420 is a pair of upper-arm switching devices (Sa, Sb, Sc) and upper-arm switching devices (S'a, S'b, S'c) that are connected in series with each other, and a total of three pairs of upper-arm and upper-arm switching devices are connected to each other in parallel Sa&S'a, Sb&S'b, Sc&S'c. A diode is connected in anti-parallel in each of the switching devices Sa, S'a, Sb, S'b, Sc, and S'c.

The switching devices in the inverter 420 turn on/off the respective switching devices based on an inverter switching control signal Sic from the inverter controller 430. Accordingly, the three-phase AC power having a certain frequency is output to the three-phase synchronous motor 230.

The inverter controller 430 may control the switching operation of the inverter 420, based on the sensorless method. To this end, the inverter controller 430 may receive an output current io detected by the output current detection unit E as an input.

The inverter controller 430 outputs an inverter switching control signal Sic to the inverter 420 in order to control the switching operation of the inverter 420. The inverter switching control signal Sic is a switching control signal of pulse width modulation (PWM), and is generated and output based on the output current io detected by the output current detection unit E. A detailed operation of the output of the inverter switching control signal Sic in the inverter controller 430 will be described later with reference to FIG. 6.

The output current detection unit E detects an output current io flowing between the inverter 420 and the three-phase motor 230. That is, the output current detection unit E detects the current flowing through the motor 230. The output current detection unit E may detect all of the output currents ia, ib, and is of each phase, or may detect the output current of two phases using three-phase equilibrium.

The output current detection unit E may be located between the inverter 420 and the motor 230, and a current transformer (CT), a shunt resistor, or the like may be used to detect the current.

When a shunt resistor is used, three shunt resistors can be located between the inverter 420 and the synchronous motor 230, or one end of the three shunt resistors can be connected to three lower-arm switching devices S'a, S'b, S'c of the inverter 420 respectively.

Meanwhile, it is also possible that two shunt resistors are used by using three-phase equilibrium. Meanwhile, when one shunt resistor is used, it is also possible that a corresponding shunt resistor is disposed between the above-described capacitor C and the inverter 420.

The detected output current io may be applied to the inverter controller 430 as a discrete signal in the form of a pulse, and an inverter switching control signal Sic is generated based on the detected output current io. Hereinafter, it may be described in parallel that the detected output current io is the three-phase output current ia, ib, ic.

The output voltage detection unit F may detect the output voltage vo output from the inverter 420. Specifically, the output voltage detection unit F may detect the output voltage vo of each phase output from the inverter 420. To this end, the output voltage detection unit F may include a resistance element, an amplifier, and the like. The detected output voltage vo may be input to the inverter controller 430 as a discrete signal in the form of a pulse.

Meanwhile, the three-phase motor 230 includes a stator and a rotor, and each phase AC power of a certain frequency is applied to the coil of the stator of each phase (a, b, c phase), so that the rotor rotates.

The motor 230 may include, for example, a Surface-Mounted Permanent-Magnet Synchronous Motor (SMPMSM), an Interior Permanent Magnet Synchronous Motor (IPMSM), a Synchronous Reluctance Motor (Synrm), and the like. Among them, SMPMSM and IPMSM are a Permanent Magnet Synchronous Motor (PMSM) applying a permanent magnet, and Synrm has no permanent magnet.

Meanwhile, the switching device 450 is disposed between the inverter 420 and the motor 230, and may convert a winding of the motor 230 into a first connection or a second connection.

Here, the first connection may represent a Y connection, and the second connection may be a Δ connection.

To this end, the switching device 450 includes three relay elements (SW1~SW3) respectively connected between the three-phase output terminals of the inverter 420 and the three-phase coils CA, Cb, and CC of the motor 230.

That is, the switching device 450 may include first to third relay elements (SW1~SW3) that are electrically connected to respective phase outputs.

The switching device 450 may operate so that the motor 230 becomes the first connection, when the motor 230 is equal to or lower than a first speed or a first operation frequency, and may operate so that the motor 230 becomes the second connection, when the first speed or the first operation frequency exceeds the first speed or the first operation frequency. Accordingly, the power conversion efficiency or the motor driving efficiency can be increased.

In particular, the power conversion efficiency or the motor driving efficiency at the first speed or at a low speed equal to or lower than the first operation frequency can be increased.

Meanwhile, the motor driving device 220 according to the embodiment of the present disclosure includes an inverter 420 which has a plurality of switching devices (Sa to Sc, S'a to S'c) (Sa to Sc, S'a to S'c), and outputs AC power to the motor 230 based on a switching operation, a switching device 450 which is disposed between the inverter 420 and the motor 230, and converts the winding of the motor 230 into the first connection or the second connection, an output current detection unit E for detecting an output current io output from the inverter 420, and a controller 170 or an inverter controller 430 for controlling the inverter 420 and the switching device 450. According to a check mode of switching device 450, during a first period Pn1, the output current io of a first level Lvn1 is output from the inverter 420 while the winding of the motor 230 is in the first connection state according to the operation of the switching device 450, and during a second period Pn2 after the first period Pn1, the output current io of the first level Lvn1 is output from the inverter 420 while the winding of the motor 230 is in the second connection state according to the operation of the switching device 450. Accordingly, it is possible to determine whether there is an abnormality in the switching device 450 that converts the connection of the motor 230. This will be described in detail below with reference to FIG. 7.

Figure 6:
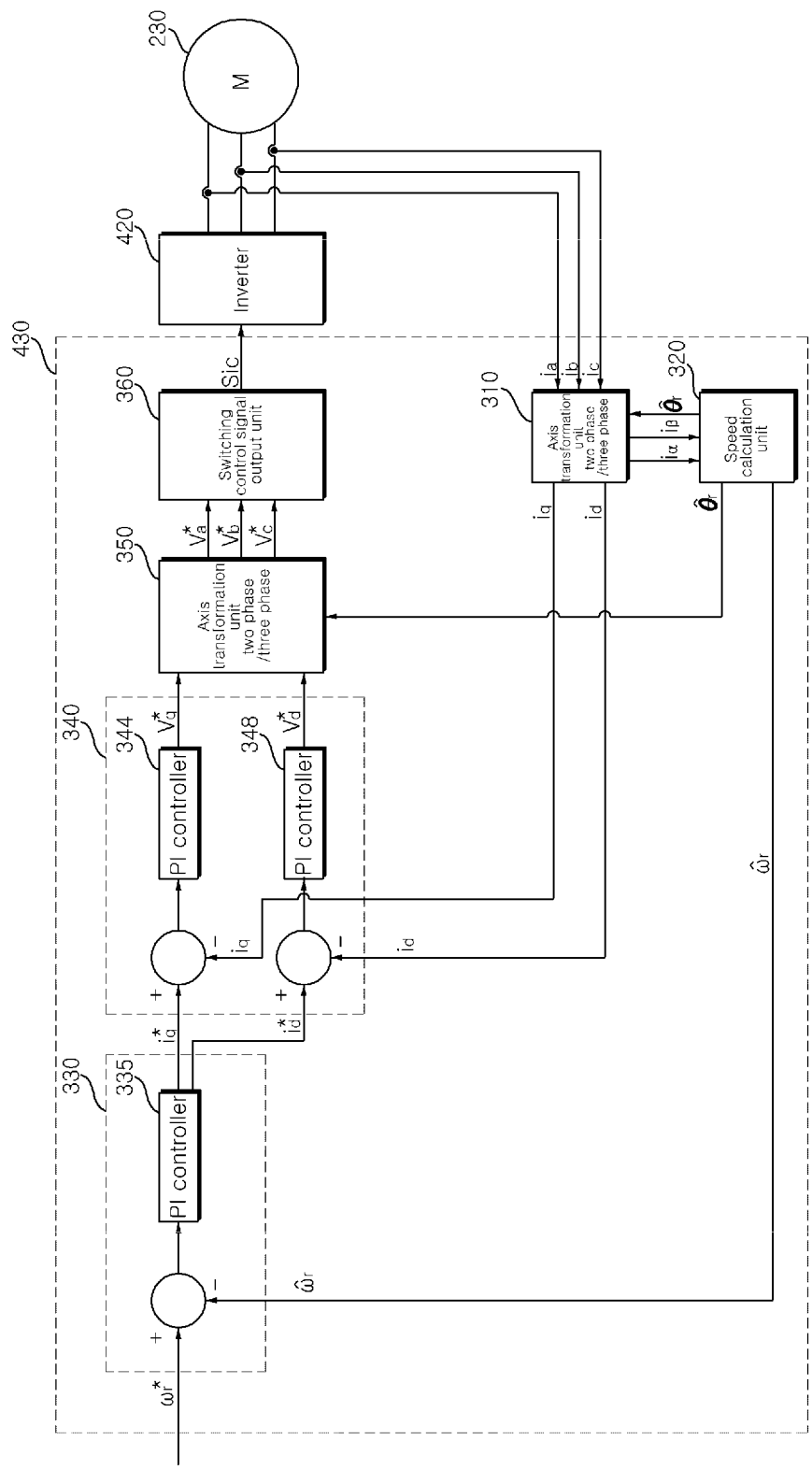
FIG. 6 is an internal block diagram of an inverter controller of FIG. 5.

FIG. 6 is an internal block diagram of an inverter controller of FIG. 5.

Referring to FIG. 6, the inverter controller 430 may include an axis transformation unit 310, a speed calculation unit 320, a current command generation unit 330, a voltage command generation unit 340, an axis transformation unit 350, and a switching control signal output unit 360.

The axis transformation unit 310 receives a three-phase output current ia, ib, is detected by the output current detection unit E, and converts it into a two-phase current iα, iβ of a stationary coordinate system.

Meanwhile, the axis transformation unit 310 may convert the two-phase current iα, iβ of the stationary coordinate system into the two-phase current id, iq of a rotational coordinate system.

The speed calculation unit 320 may output the calculated position $\hat{\theta}$, and the calculated speed $\hat{\omega}f$, based on the two-phase current iα, iβ of the stationary coordinate system which is axis-transformed by the axis transformation unit 310.

Meanwhile, the current command generation unit 330 generates a current command value i*q based on the calculation speed $\hat{\omega}$, and a speed command value ω*r. For example, the current command generation unit 330 performs a PI control in a PI controller 335, based on a difference between the calculation speed $\hat{\omega}$, and the speed command value ω*r, and may generate the current command value i*q. In the drawing, a q-axis current command value i*q is exemplified as the current command value, but unlike the drawing, it is also possible to generate a d-axis current command value i*d together. Meanwhile, the value of the d-axis current command value i*d may be set to 0.

Meanwhile, the current command generation unit 330 may further include a limiter (not shown) for limiting a level so that the current command value i*q does not exceed an allowable range.

Next, the voltage command generation unit 340 generates d-axis and q-axis voltage command values v*d, v*q, based on the d-axis and q-axis currents id, iq that are axis-transformed into the two-phase rotational coordinate system by the axis transformation unit, and the current command value i*d, i*q, etc. from the current command generation unit 330. For example, the voltage command generation unit 340 performs a PI control in the PI controller 344, based on a difference between the q-axis current iq and the q-axis current command value i*q, and may generate the q-axis voltage command value v*q. In addition, the voltage command generation unit 340 performs a PI control in the PI controller 348, based on a difference between the d-axis current id and the d-axis current command value i*d, and may generate the d-axis voltage command value v*d. Meanwhile, the voltage command generation unit 340 may further include a limiter (not shown) for limiting a level so that the d-axis, q-axis voltage command values v*d, v*q does not exceed an allowable range.

Meanwhile, the generated d-axis and q-axis voltage command values v*d, v*q are input to the axis transformation unit 350.

The axis transformation unit 350 receives a location $\hat{\theta}_r$ calculated by the speed calculation unit 320 and the d-axis and q-axis voltage command values v*d, v*q, and performs the axis-transform.

First, the axis transformation unit 350 performs transformation from a two-phase rotational coordinate system to a two-phase stationary coordinate system. In this case, the location $\hat{\theta}_r$, calculated by the speed calculation unit 320 may be used.

Then, the axis transformation unit 350 performs transformation from the two-phase stationary coordinate system to the three-phase stationary coordinate system. Through this conversion, the axis transformation unit 1050 outputs a three-phase output voltage command value v*a, v*b, v*c.

The switching control signal output unit 360 generates and outputs a switching control signal Sic for inverter according to a pulse width modulation (PWM) method, based on the three-phase output voltage command value v*a, v*b, v*c.

The output inverter switching control signal Sic may be converted into a gate driving signal by a gate driver (not shown), and input to a gate of each switching device in the inverter 420. Accordingly, each of the switching devices Sa, S'a, Sb, S'b, Sc, and S'c in the inverter 420 performs a switching operation.

Meanwhile, as described above, it is essential that the motor driving device 220 detects the output current io flowing through the motor, in particular, the phase current, in order to perform a vector control that drives the motor 230 through an inverter 420 control.

The inverter controller 430 may control the motor 230 at a desired speed and torque, by using the current command generation unit 330 and the voltage command generation unit 340, by using the detected phase current.

Figure 7:
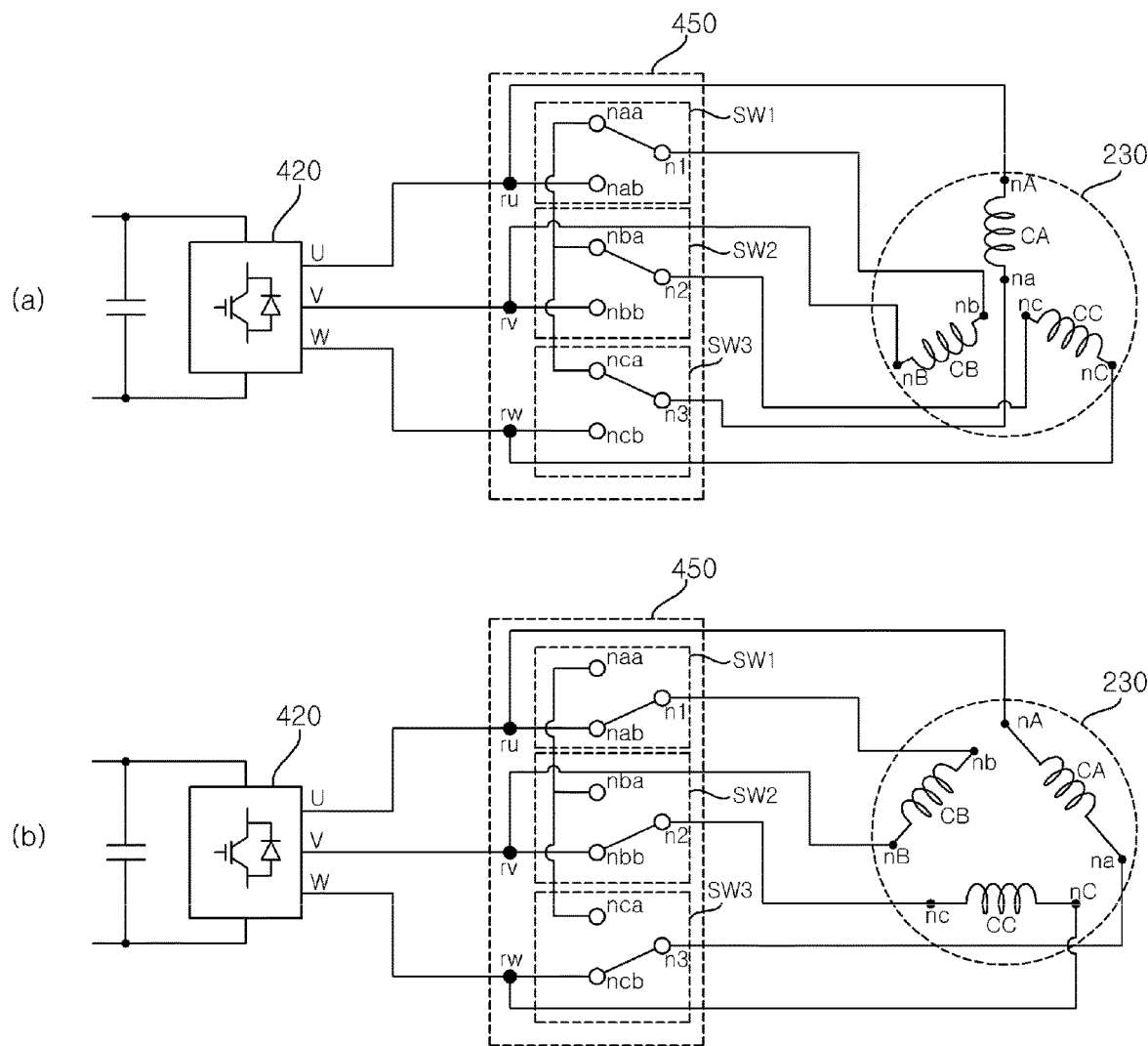
FIG. 7 is a diagram for explaining the operation of a switching device of FIG. 4.

FIG. 7 is a diagram for explaining the operation of a switching device of FIG. 4.

Referring to the drawing, FIG. 7A illustrates that the motor 230 operates in the Y connection which is the first connection, according to the operation of the switching device 450, and FIG. 7B illustrates that the motor 230 operates in the Δ connection which is the second connection, according to the operation of the switching device 450.

The switching device 450 includes first to third relay elements (SW1~SW3) electrically connected to each phase output of the inverter 420.

A first terminal naa of the first relay element SW1, a first terminal nba of the second relay element SW2, and a first terminal nca of the third relay element SW3 are connected in parallel, one terminal nA of a first winding CA of the motor 230 is connected to a second terminal nab of the first relay element SW1, one terminal nB of a second winding CB of the motor 230 is connected to a second terminal nbb of the second relay element SW2, one terminal nC of a third winding CC of the motor 230 is connected to the second terminal ncb of a third relay element SW3, the other terminal na of the first winding CA of the motor 230 is connected to a common terminal n3 of the third relay element SW3, the other terminal nb of the second winding CB of the motor 230 is connected to a common terminal n1 of the first relay element SW1, and the other terminal nc of the third winding CC of the motor 230 is connected to the common terminal n2 of the second relay element SW2.

Meanwhile, the second terminal nab of the first relay element SW1 is connected to a u-phase output terminal ru of the inverter 420, the second terminal nbb of the second relay element SW2 is connected to a v-phase output terminal ry of the inverter 420, and the second terminal ncb of the third relay element SW3 is connected to a w-phase output terminal rw of the inverter 420.

As shown in FIG. 7A, for the first connection, the controller 170 or the inverter controller 430 may control the common terminals n1, n2, n3 of the first to third relay elements (SW1~SW3), to be electrically connected to the first terminals naa, nba, nca of the first to third relay elements (SW1~SW3), respectively.

Accordingly, the output currents of the u, v, w phases of the inverter 420 flow to the a-phase coil Ca, the b-phase coil CB, and the c-phase coil CC in the Y-connected motor 230, respectively.

As shown in FIG. 7B, for the second connection, the controller 170 or the inverter controller 430 may control the common terminals n1, n2, n3 of the first to third relay elements (SW1~SW3) to be electrically connected to the second terminals nab, nbb, and ncb of the first to third relay elements (SW1~SW3), respectively.

Accordingly, the output currents of the u, v, w phases of the inverter 420 flow to the b-phase coil CB, c-phase coil CC, and a-phase coil Ca in the Δ-connected motor 230, respectively.

As a result, it is possible to control the motor 230 to operate with the first connection or the second connection through the switching device 450. Furthermore, it is possible to increase the power conversion efficiency or the driving efficiency of the motor 230.

Figure 8A:
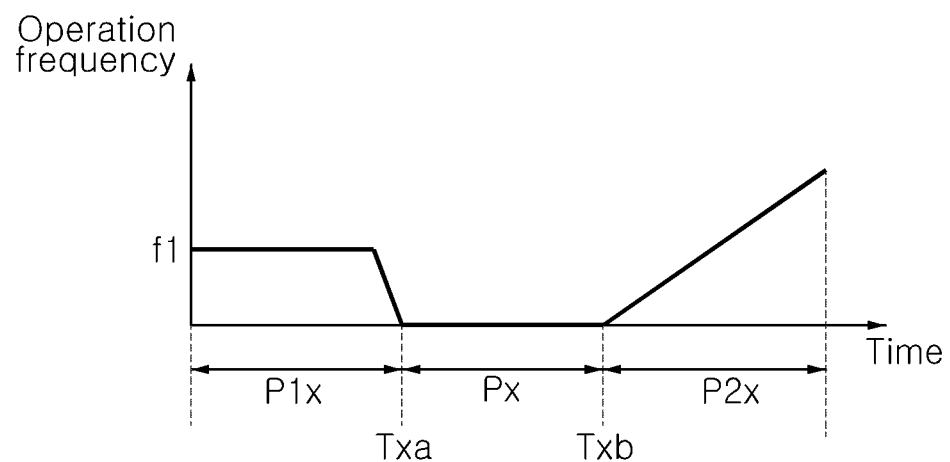
FIGS. 8A and 8B are timing diagrams illustrating a winding switching operation of the switching device of FIG. 7.
Figure 8B:
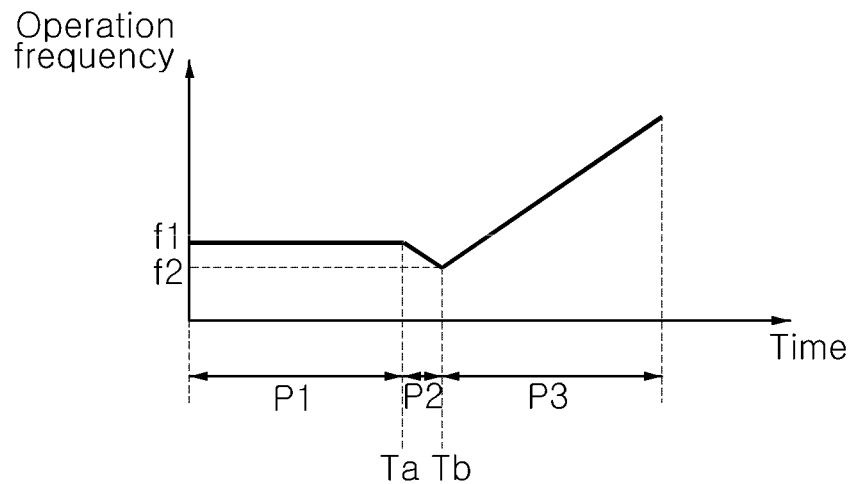

FIGS. 8A and 8B are timing diagrams illustrating a winding switching operation of the switching device of FIG. 7.

First, FIG. 8A is a timing diagram illustrating an example of a winding switching operation of a switching device.

Referring to the drawing, when the operation frequency of the motor 230 is less than or equal to f1, the switching device 450 may operate such that the motor 230 is in a Y-connection state, as shown in FIG. 7A.

In the drawing, it is illustrated that the switching device 450 operates so that the motor 230 is in a Y-connection state during a period P1x ranging up to a time Txa.

Next, during a period Px ranging from a time Txa to a time Txb, the motor 230 may stop.

Next, during the period P2x after the time Txb, the switching device 450 may operate such that the motor 230 is in a Δ connection state, as shown in FIG. 7B.

For example, when the operation frequency of the motor 230 exceeds f1, the switching device 450 operates such that the motor 230 is in the Δ connection state. In order to convert from the Y connection to the Δ connection, during the period Px, the motor 230 may stop.

Next, FIG. 8B is a timing diagram showing another example of a winding switching operation of the switching device.

Referring to the drawing, when the operation frequency of the motor 230 is less than or equal to f1, the switching device 450 may operate such that the motor 230 is in a Y-connection state, as shown in FIG. 7B.

In the drawing, it is illustrated that the switching device 450 operates so that the motor 230 is in the Y-connection state during the period P1 ranging up to the time Ta.

Next, during the period P2 ranging from the time Ta to the time Tb, the controller 170 or the inverter controller 430 may control the winding of the motor 230 to be converted from the first connection to the second connection.

In particular, the controller 170 or the inverter controller 430 may control such that the motor 230 does not stop, and the operation frequency of the motor 230 temporarily decreases from a first frequency f1 to a second frequency f2, during the period P2.

Next, during a period P3 after the time Tb, the switching device 450 may operate so that the motor 230 is in the Δ-connection state, as shown in FIG. 7B.

For example, when the operation frequency of the motor 230 exceeds f1, the controller 170 or the inverter controller 430 controls the switching device 450 to operate so that the motor 230 is in a Δ connection state.

Specifically, during the period P3, the controller 170 or the inverter controller 430 may control the operation frequency of the motor 230, which has temporarily decreased to the second frequency f2, to increase again.

The controller 170 or the inverter controller 430 may control the motor 230 to continuously operate without stopping, while the switching device 450 converts the winding of the motor 230 from the first connection to the second connection. As described above, since the motor 230 does not stop during the switching operation of the switching device 450, the operating efficiency of the motor 230 can be improved.

Meanwhile, the period P2 in FIG. 8B is preferably shorter than the period Px in FIG. 8A. Accordingly, the winding of the motor 230 can be converted from the first connection to the second connection while temporarily decreasing the speed of the motor 230.

Figure 9A:
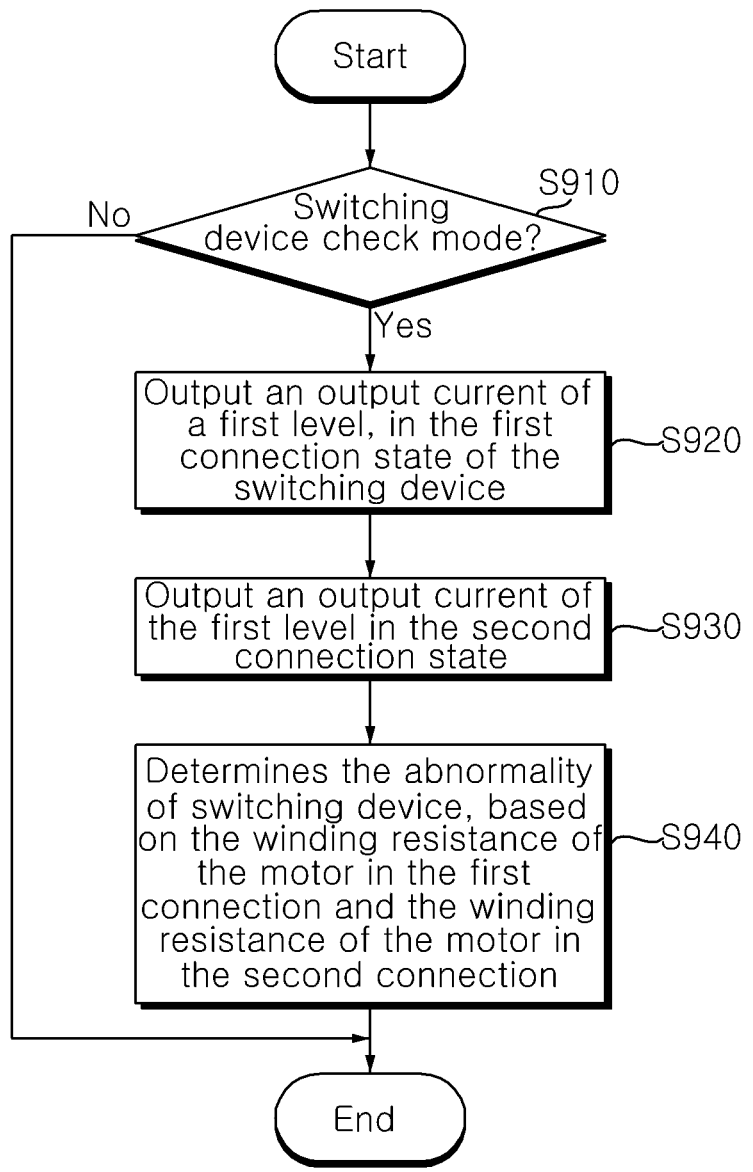
FIG. 9A is a flowchart illustrating a method of operating a motor driving device according to an embodiment of the present disclosure.

FIG. 9A is a flowchart illustrating a method of operating a motor driving device according to an embodiment of the present disclosure.

Referring to the drawing, the controller 170 or the inverter controller 430 determines whether it is a switching device check mode in the motor driving device 220 (S910).

For example, the controller 170 or the inverter controller 430 may control the switching device check mode to be performed, before the motor 230 is driven.

As another example, the controller 170 or the inverter controller 430 may control the switching device check mode to be performed, when the change in the operation frequency is greater than or equal to a certain value while the motor 230 is being driven.

The controller 170 or the inverter controller 430 controls the inverter 420 to output an output current of a first level, while the winding of the motor 230 is in the first connection according to the operation of the switching device 450, during the first period, in the switching device check mode (S920).

Next, in case of the switching device check mode, during the second period after the first period, in a state in which the winding of the motor 230 is in the second connection according to the operation of the switching device 450, the controller 170 or the inverter controller 430 controls the inverter 420 to output an output current of the first level which is the same level as in the first connection state (S930).

Next, the controller 170 or the inverter controller 430 determines whether the switching device 450 operates abnormally, based on the winding resistance of the motor 230 in the first connection and the winding resistance of the motor 230 in the second connection (S940).

For example, the controller 170 or the inverter controller 430 may calculate the first winding resistance of the motor 230, based on a first output voltage Lvn3 detected according to the output of the output current io of the first level Lvn1 during the first period Pn1, calculate the second winding resistance of the motor 230, based on a second output voltage Lvn4 detected according to the output of the output current io of the first level Lvn1 during the second period Pn2, and determine whether the switching device 450 operates abnormally, based on the first winding resistance and the second winding resistance. Accordingly, it is possible to easily determine whether there is an abnormality in the switching device 450 for converting the connection of the motor 230.

Specifically, the controller 170 or the inverter controller 430 may calculate a ratio of the first winding resistance and the second winding resistance, and determine whether the switching device 450 operates abnormally, based on the calculated ratio. Accordingly, it is possible to easily determine whether there is an abnormality in the switching device 450 for converting the connection of the motor 230.

Meanwhile, the controller 170 or the inverter controller 430 may calculate the ratio of the first winding resistance and the second winding resistance for each phase, determine that the switching device 450 is normal when the ratio of all phases among the calculated ratios is within a certain range, and control the switching device 450 to convert the winding of the motor 230 from the first connection to the second connection according to the operation frequency of the motor 230. Accordingly, it is possible to increase the power conversion efficiency or the driving efficiency of motor 230 when the switching device 450 operates normally.

Figure 9B:
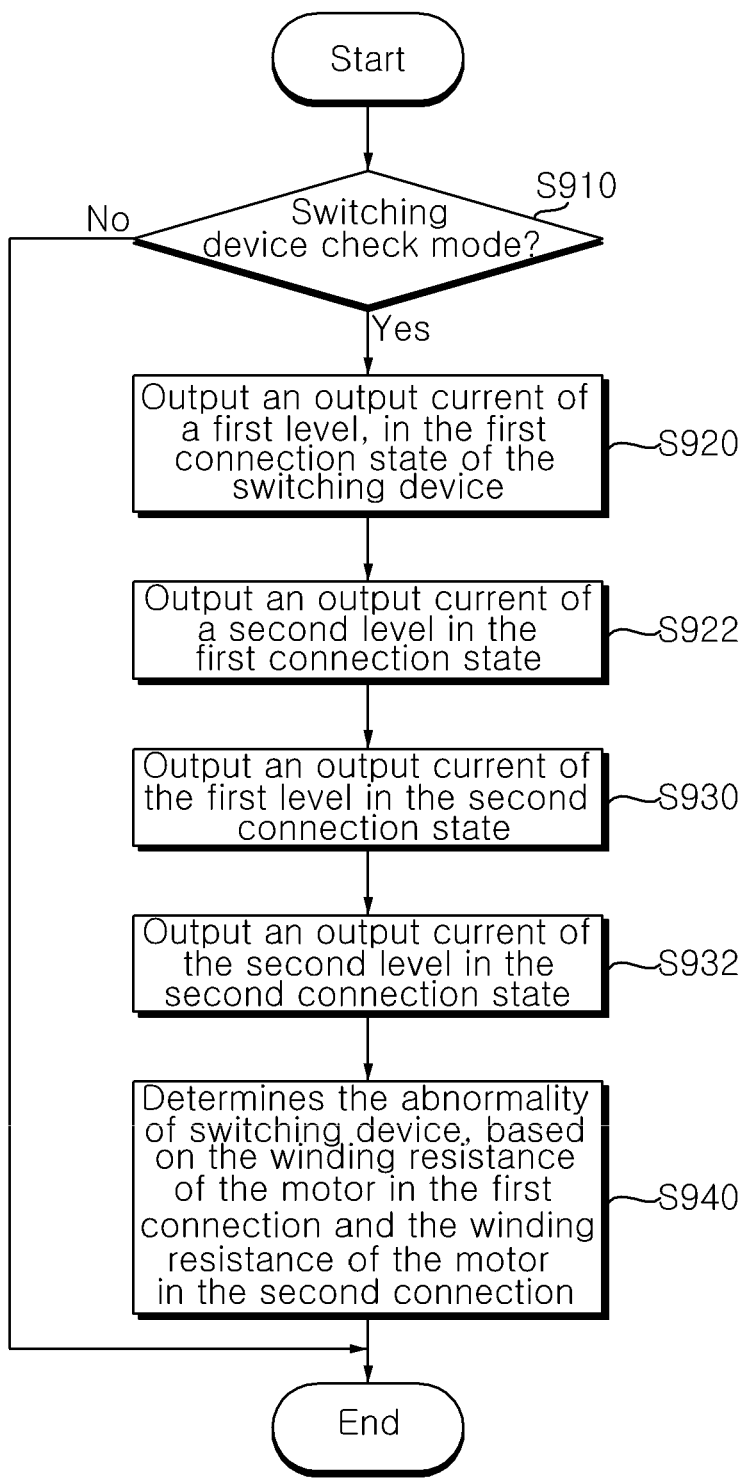
FIG. 9B is a flowchart illustrating a method of operating a motor driving device according to another embodiment of the present disclosure.

FIG. 9B is a flowchart illustrating a method of operating a motor driving device according to another embodiment of the present disclosure.

Referring to the drawings, the operation method of FIG. 9B is similar to the operation method of FIG. 9A, but there is a difference in outputting a plurality of levels of output currents instead of outputting only an output current of a first level.

Accordingly, step 910 (S910), step 920 (S920), step 930 (S930), and step 940 (S940) refer to the description of FIG. 9A.

In step 920 (S920), in the case of a switching device check mode, during a first period, in a state in which the winding of the motor 230 is in the first connection according to the operation of the switching device 450, the controller 170 or the inverter controller 430 controls the inverter 420 to output an output current of the first level.

Next, during the first period, in a state in which the winding of the motor 230 is in the first connection according to the operation of the switching device 450, after the output of the first level output current, the controller 170 or the inverter controller 430 controls the inverter 420 to output an output current of a second level different from the first level (S922).

For example, the second level may be higher than the first level.

Next, in the case of a switching device check mode, during a second period, in a state in which the winding of the motor 230 is in the second connection according to the operation of the switching device 450, the controller 170 or the inverter controller 430 controls the inverter 420 to output an output current of the first level (S930).

Next, during the second period, in a state in which the winding of the motor 230 is in the second connection according to the operation of the switching device 450, after the output of the first level output current, the controller 170 or the inverter controller 430 controls the inverter 420 to output an output current of a second level different from the first level (S932).

The first level and the second level in the second connection state may be the same level as the first level and the second level in the first connection state, respectively.

Next, the controller 170 or the inverter controller 430 determines whether the switching device 450 is abnormally operates, based on the winding resistance of the motor 230 in the first connection and the winding resistance of the motor 230 in the second connection (S940).

For example, the controller 170 or the inverter controller 430 may calculate the first winding resistance of the motor 230, based on the output voltage Lvm3 detected according to the output of the output current of the first level Lvm1 during the first period Pm1 and the output voltage Lvm4 detected according to the output of the output current of the second level Lvm2, calculate the second winding resistance of the motor 230, based on the output voltage Lvm5 detected according to the output of the output current of the first level Lvm1 during the first period Pm1 during the second period Pn2 and the output voltage Lvm6 detected according to the output of the output current of the second level Lvm2, and determine whether the switching device 450 operates abnormally, based on the first winding resistance and the second winding resistance. Accordingly, it is possible to easily determine whether there is an abnormality in the switching device 450 for converting the connection of the motor 230.

Specifically, the controller 170 or the inverter controller 430 may calculate a ratio of the first winding resistance and the second winding resistance, and determine whether the switching device 450 operates abnormally based on the calculated ratio. Accordingly, it is possible to easily determine whether there is an abnormality in the switching device 450 for converting the connection of the motor 230.

Meanwhile, the controller 170 or the inverter controller 430 may calculate the ratio of the first winding resistance and the second winding resistance for each phase, determine that the switching device 450 is normal when the ratio of all phases among the calculated ratios is within a certain range, and control the switching device 450 to convert the winding of the motor 230 from the first connection to the second connection according to the operation frequency of the motor 230. Accordingly, when the switching device 450 operates normally, it is possible to increase the power conversion efficiency or the driving efficiency of motor 230.

FIGS. 10A to 14C are diagrams for explaining the operation method of FIG. 9A or 9B.

Figure 10A:
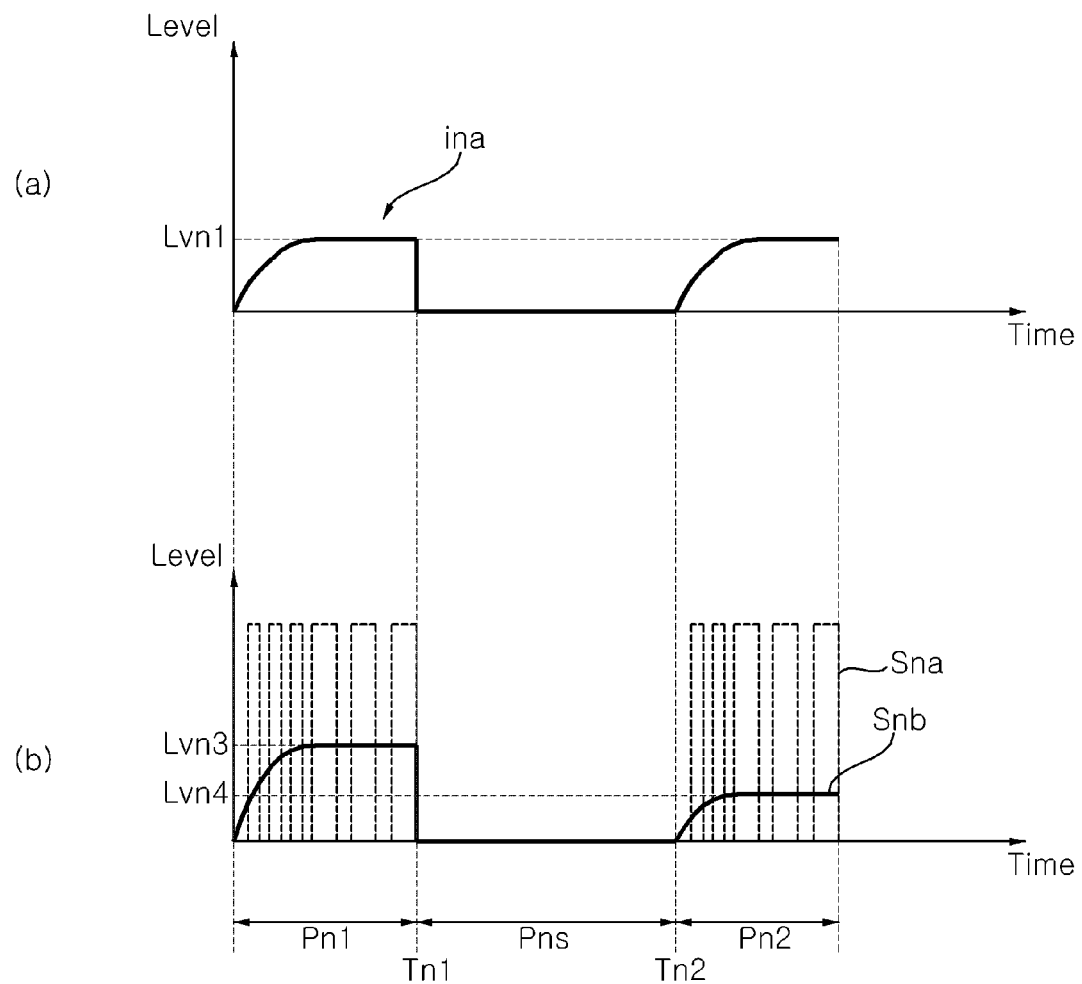
FIGS. 10A to 14C are diagrams for explaining the operation method of FIG. 9A or 9B.

First, FIG. 10A is a diagram for explaining the operation method of FIG. 9A.

Referring to the drawing, FIG. 10A(a) illustrates an output current ina output from the inverter 420, in particular, a phase current.

During the period Pn1, in a state in which the motor 230 is in the first connection by the operation of the switching device 450, the inverter controller 430 controls the inverter 420 to output the output current of the first level Lvn1.

The period Pns after the period P1 is a conversion period from the first connection to the second connection, and in this period, the inverter 420 may not output current. Meanwhile, unlike the drawing, it is also possible that a current having a lower level than the output current of the first level Lvn1 is output during the period Pns. Due to the output of the output current, the speed of the motor 230 may temporarily decrease as in the period P2 of FIG. 8B.

Next, during the period P2 after the period Pns, in a state in which the motor 230 is in the second connection by the operation of the switching device 450, the inverter controller 430 may control the inverter 420 to output an output current of the first level Lvn1.

FIG. 10A(b) illustrates a switching voltage Sna corresponding to the output current ina output from the inverter 420 and an output voltage Snb that is an effective voltage.

Meanwhile, the output voltage Snb may correspond to a phase voltage.

Until the time Tn1 which is the end point of the period Pn1, the pulse width of the switching voltage Sna rises and then is uniformly maintained, and the output voltage rises and then maintains a third level Lvn3.

During the period Pns after the period Pn1, the output voltage becomes zero, during the period P2 from the time Tn2 after the period Pns, the pulse width of the switching voltage Sna rises and then is uniformly maintained, and the output voltage rises and then maintains the fourth level Lvn4 smaller than the third level Lvn3.

As shown in FIG. 10A(b), the controller 170 or the inverter controller 430 may calculate the first winding resistance in the first connection and the second winding resistance in the second connection, according to a difference between the output voltages Snb in the first connection and in the second connection.

Meanwhile, since the output current output from the inverter 420 is the same, if the operation of the switching device 450 is normal, the first winding resistance, which has a larger level of the output voltage Snb, becomes greater than the second winding resistance.

Based on these features, the controller 170 or the inverter controller 430 may determine whether the switching device 450 operates abnormally.

Meanwhile, in FIG. 10A, a single phase current ina is illustrated, but unlike this, the controller 170 or the inverter controller 430 may control such that the u-phase current, v-phase current, w-phase current, which are the output terminals of each phase of the inverter 420, sequentially have the waveform of FIG. 10A.

The controller 170 or the inverter controller 430 may calculate the first winding resistance in the first connection and the second winding resistance in the second connection by using the relationship R=V/I.

At this time, the controller 170 or the inverter controller 430 may determine that it is normal when the ratio of the first winding resistance in the first connection to the second winding resistance in the second connection is maintained within a constant range, and may determine that the switching device 450 is abnormal when it deviates a certain range.

In addition, the controller 170 or the inverter controller 430 may determine that the switching device 450 is abnormal or normal, depending on whether the first winding resistance in the first connection is within a first range.

Meanwhile, the controller 170 or the inverter controller 430 may determine that the switching device 450 is abnormal or normal, depending on whether the second winding resistance in the second connection is within a second range.

Figure 10B:
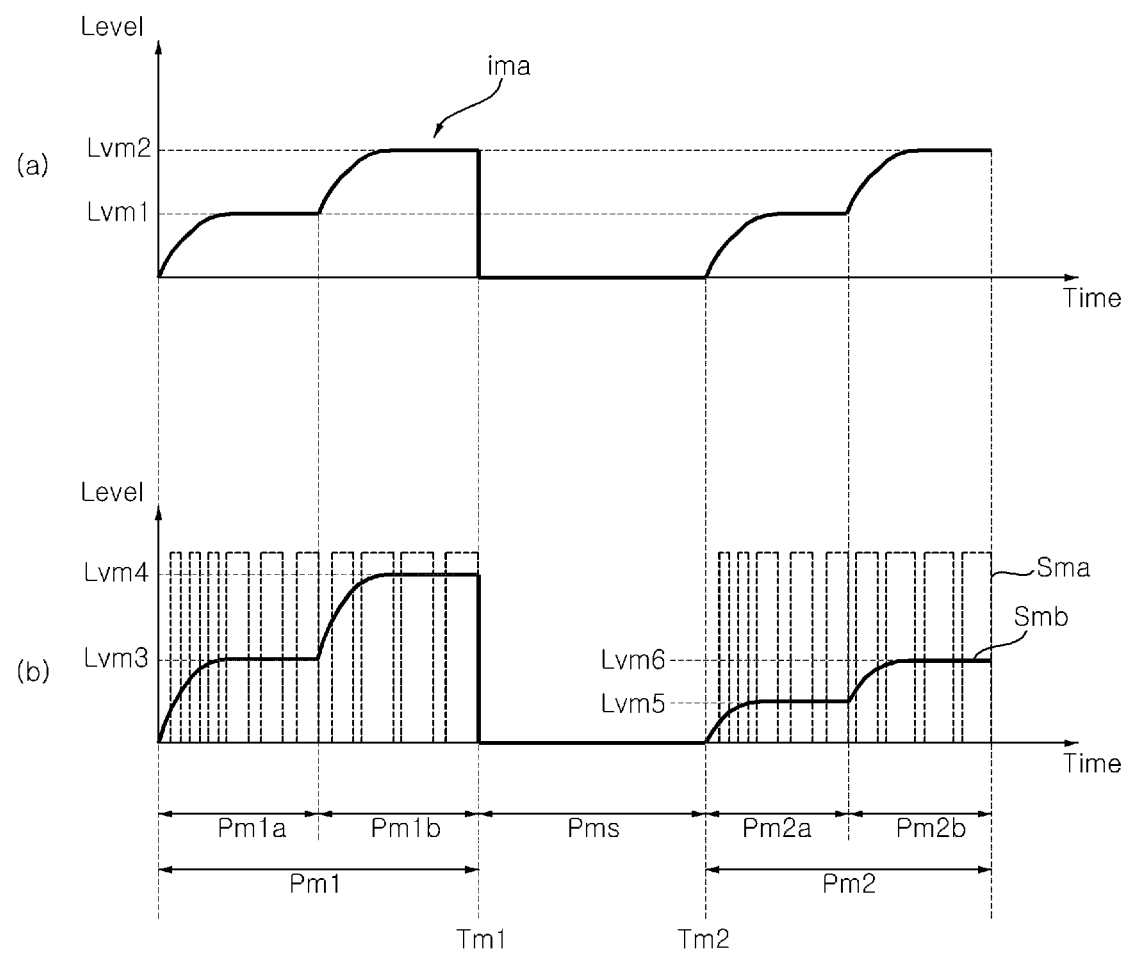

Next, FIG. 10B is a diagram for explaining the operation method of FIG. 9B.

Referring to the drawing, FIG. 10B(a) illustrates an output current ima output from the inverter 420, in particular, a phase current.

During the period Pm1a of the period Pm1, in a state in which the motor 230 is in the first connection by the operation of the switching device 450, the inverter controller 430 may control the inverter 420 to output an output current of the first level Lvm1.

Next, during the period Pm1*b* of the period Pm1, in a state in which the motor 230 is in the first connection by the operation of the switching device 450, the inverter controller 430 may control the inverter 420 to output an output current of the second level LVm2 greater than the first level Lvm1.

The period Pms after the period Pm1 is a conversion period from the first connection to the second connection, and in this period, current may not be output from the inverter 420.

Meanwhile, unlike the drawing, it is also possible that a current having a lower level than the output current of the first level Lvm1 is output during the period Pms. Due to the output of the output current, the speed of the motor 230 may temporarily decrease, as in the period P2 of FIG. 8B.

Next, during the period Pm2*a* of the period Pm2 after the period Pms, in a state in which the motor 230 is in the second connection by the operation of the switching device 450, the inverter controller 430 may control the inverter 420 to output an output current of the first level Lvm1.

Next, during the period Pm2*b* of the period Pm2, in a state in which the motor 230 is in the second connection by the operation of the switching device 450, the inverter controller 430 controls the inverter 420 to output an output current of the second level LVm2 greater than the first level Lvm1.

FIG. 10B(b) illustrates a switching voltage Sma corresponding to the output current ima output from the inverter 420 and an output voltage Smb that is an effective voltage.

Meanwhile, the output voltage Smb may correspond to a phase voltage.

During the period Pm1*a* of the period Pm1, the pulse width of the switching voltage Sma rises and then is uniformly maintained, and the output voltage rises and then maintains a third level Lvm3. During the period Pm1*b* of the period Pm1, the pulse width of the switching voltage Sma rises and then is uniformly maintained, and the output voltage rises and then maintains a fourth level Lvm4.

During the period Pms after the period Pm1, the output voltage becomes zero.

After the period Pms, during the period Pm2*a* of the period P2 from the time Tm2, the pulse width of the switching voltage Sma rises and then is uniformly maintained. The output voltage rises and then maintains a fifth level Lvm5, and during the period Pm2*b* of the period Pm2, the pulse width of the switching voltage Sma rises again and then is uniformly maintained. The output voltage rises again and maintains a sixth level Lvm6.

In this case, the fifth level Lvm5 may be smaller than the third level Lvm3, and the sixth level Lvm6 may be smaller than the fourth level Lvm4.

As shown in FIG. 10B(b), the controller 170 or the inverter controller 430 may calculate the first winding resistance in the first connection, and the second winding resistance in the second connection, according to a difference between the output voltages Smb in the first connection and the second connection, Compared to FIG. 10A, various levels of output currents are outputted, and based on this, the winding resistance is calculated, so that the accuracy of the calculated winding resistance may be further improved.

In particular, compared to FIG. 10A, the influence of components excluding a stator resistance can be removed by outputting various levels of output currents, thereby further improving the accuracy of the calculated winding resistance.

Meanwhile, since the output current output from the inverter 420 is the same, if the operation of the switching device 450 is normal, the first winding resistance, which has a larger level of output voltage Smb, becomes greater than the second winding resistance.

Based on these features, the controller 170 or the inverter controller 430 may determine whether the switching device 450 operates abnormally.

Meanwhile, in FIG. 10B, a single phase current ina is illustrated, but unlike this, the controller 170 or the inverter controller 430 may control such that the u-phase current, v-phase current, w-phase current, which are the output terminals of each phase of the inverter 420, sequentially have the waveform of FIG. 10B.

Figure 11:
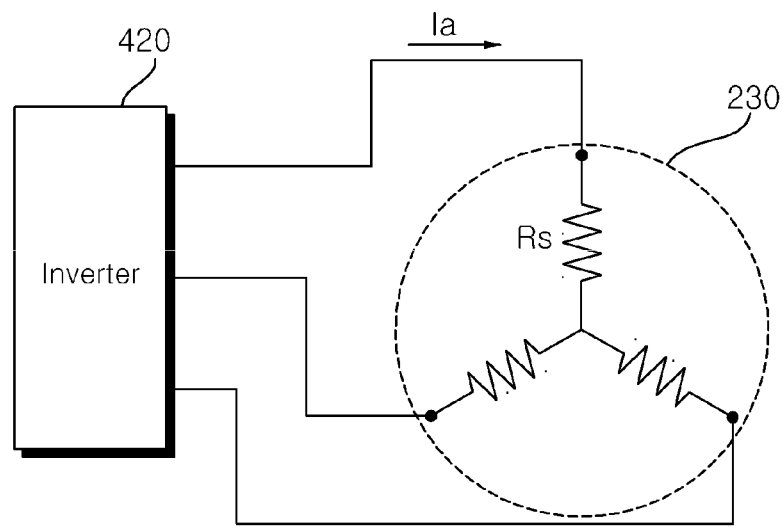
Figure 11:
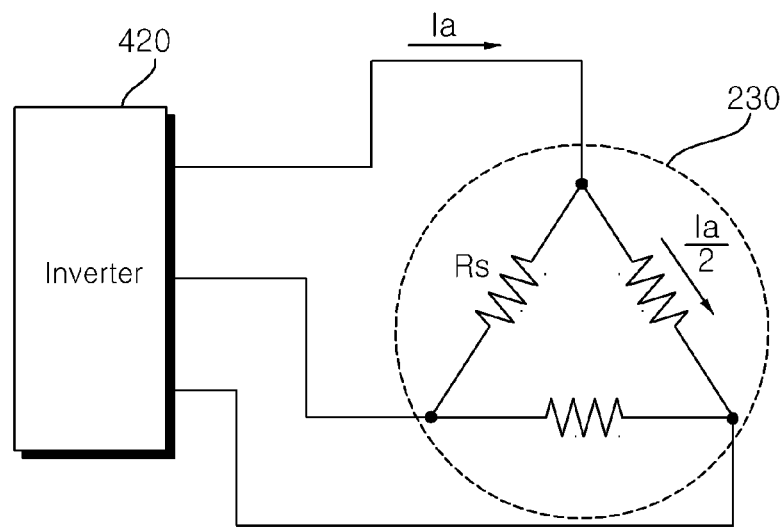

FIG. 11 is a diagram showing a simplified equivalent circuit diagram of the motor in the first connection and the second connection.

Referring to the drawing, FIG. 11A illustrates an equivalent circuit diagram of the motor 230, as a Y connection which is the first connection.

Meanwhile, when the voltage Va is applied to control the current Ia in the Y connection, the stator winding becomes 3/2Ra.

Next, FIG. 11B illustrates an equivalent circuit diagram of the motor 230, as a Δ connection which is the first connection.

Meanwhile, in the Δ connection, when the output current Ia is output, Va is reduced by ⅓ compared to the Y connection. The reason is that the winding resistance is reduced to ½Ra.

Figures 12A, 12B:
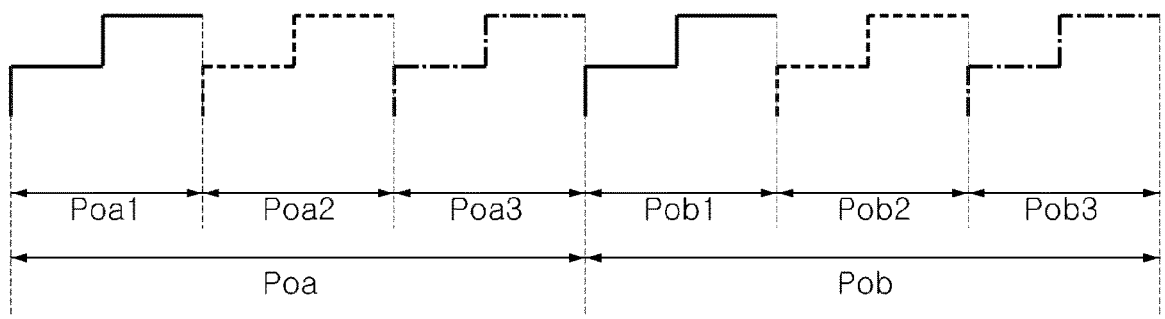

Accordingly, the controller 170 or the inverter controller 430 may use this difference to check whether the connection is normally changed by the switching device 450. FIG. 12A is a diagram illustrating a detected output voltage, as phase currents of the first level and the second level are sequentially applied in the first connection and the second connection.

Referring to the drawing, the period Poa of FIG. 12A illustrates the U-phase output voltage during the period Poa1, the V-phase output voltage during the period Poa2, and the W-phase output voltage during the period Poa3, as the U-phase output current, V-phase output current, and W-phase output current of the first level Lvm1 and the second level LVm2 are output, in the first connection.

As shown in the drawing, the U-phase output voltage during the period Poa, the V-phase output voltage during the period Poa, and the W-phase output voltage during the period Poa may have two voltage levels respectively.

The controller 170 or the inverter controller 430 may calculate the first winding resistance of each phase U, V, W, based on the output current of each phase U, V, W of the first level Lvm1 and the second level LVm2 and the output voltage of each phase U, V, W, in the first connection.

Next, the period Pob of FIG. 12A illustrates the U-phase output voltage during the period Pob1, the V-phase output voltage during the period Pob2, and the W-phase output voltage during the period Pob3, as the U-phase output current, V-phase output current, and W-phase output current of the first level Lvm1 and the second level LVm2 are output, in the second connection.

As shown in the drawing, the U-phase output voltage during the period Pob, the V-phase output voltage during the period Pob, and the W-phase output voltage during the period Pob may have two voltage levels respectively.

The controller 170 or the inverter controller 430 may calculate the second winding resistance of each phase U, V, W, in the second connection, based on the output current of each phase U, V, W of the first level Lvm1 and the second level LVm2 and the output voltage of each phase U, V, W.

Then, the controller 170 or the inverter controller 430 may determined whether the switching device 450 is abnormal, based on the first winding resistance of each phase U, V, W and the second winding resistance of each phase U, V, W.

FIG. 12B is a drawing showing the first winding resistance of each phase U, V, W, the second winding resistance of each phase U, V, W, and the ratio, when the operation of the switching device 450 is normal.

Referring to the drawing, the winding resistance of the U phase, the winding resistance of the V phase, and the winding resistance of the W phase in the first connection may be 0.96, 0.96, and 0.975, respectively.

Meanwhile, each of the winding resistance of the U phase, the winding resistance of the V phase, and the winding resistance of the W phase may correspond to a winding resistance corresponding to a-phase winding CA, a winding resistance corresponding to b-phase winding CB, and a winding resistance corresponding to c-phase winding CC of FIG. 7.

Meanwhile, in the second connection, the winding resistance of the U phase, the winding resistance of the V phase, and the winding resistance of the W phase may be 0.41, 0.42, and 0.42Ω, respectively.

In this regard, the U-phase winding resistance ratio, V-phase winding resistance ratio, and W-phase winding resistance ratio, which are ratios of winding resistance in the first connection to the second connection, may be 2.3, 2.3, and 2.3, respectively.

That is, when the operation of the switching device 450 is normal, it is preferable that a first range, which is the normal range of the winding resistance in the first connection, is approximately 0.7 to 1.2Ω, it is preferable that a second range, which is the normal range of the winding resistance in the second connection, is approximately 0.3 to 0.6Ω, and it is preferable that a third range, which is the normal range of the winding resistance ratio of the first connection to the second connection, is approximately 2.0 to 2.5.

Based on the data of FIG. 12B, the controller 170 or the inverter controller 430 may determine whether the switching device 450 is abnormal.

For example, the controller 170 or the inverter controller 430 may calculate the ratio of the first winding resistance and the second winding resistance for each phase U, V, W, may determine that the switching device 450 is abnormal when the ratio of at least one phase among the calculated ratios deviates from a certain range, and may control the winding of the motor 230 to operate in either the first connection or the second connection. Thus, the emergency operation of the motor 230 can be achieved by operating only in one connection state when the switching device 450 is abnormal.

Meanwhile, the controller 170 or the inverter controller 430 may calculate the first winding resistance and the second winding resistance for each phase U, V, W, and determine as a failure of the motor 230, when the range of the first winding resistance for each phase U, V, W deviates from a first range, and when the range of the second winding resistance for each phase U, V, W deviates from a second range. Accordingly, it is possible to easily determine whether the motor 230 has failed.

Meanwhile, the controller 170 or the inverter controller 430 may calculate the first winding resistance and the second winding resistance for each phase U, V, W, may determine that the switching device 450 is normal when the range of the first winding resistance for each phase U, V, W is within the first range, and the range of the second winding resistance for each phase U, V, W is within the second range, and may control the switching device 450 to convert the winding of the motor 230 from the first connection to the second connection according to the operation frequency of the motor 230. Accordingly, when the switching device 450 operates normally, the power conversion efficiency or the motor 230 driving efficiency can be increased.

Meanwhile, the controller 170 or the inverter controller 430 may calculate the first winding resistance and the second winding resistance for each phase U, V, W, may determine that the switching device 450 is abnormal when the range of the first winding resistance for each phase U, V, W is within the first range, and the range of the second winding resistance for each phase U, V, W deviates from the second range, and may control the winding of the motor 230 to operate only in the first connection. Thus, the emergency operation of the motor 230 can be achieved by operating only in one connection state, when the switching device 450 is abnormal.

Meanwhile, the controller 170 or the inverter controller 430 may calculate the first winding resistance and the second winding resistance for each phase U, V, W, may determine that the switching device 450 is abnormal when the range of the first winding resistance for each phase U, V, W deviates from the first range, and the range of the second winding resistance for each phase U, V, W is within the second range, and may control the winding of the motor 230 to operate only in the second connection. Thus, the emergency operation of the motor 230 can be achieved by operating only in one connection state, when the switching device 450 is abnormal.

Figure 13A:
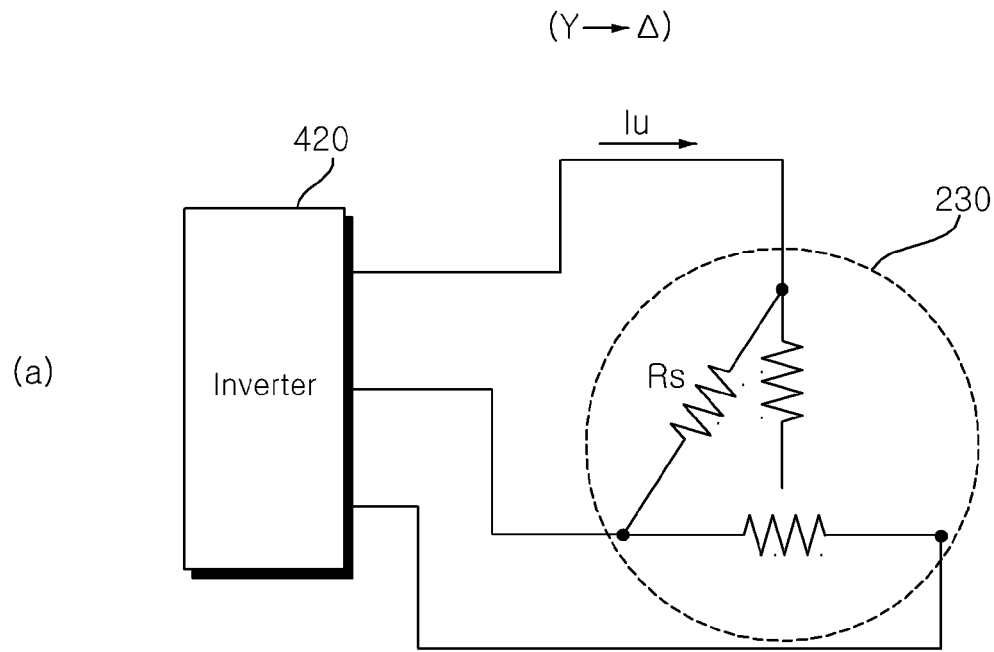
Figure 13B:
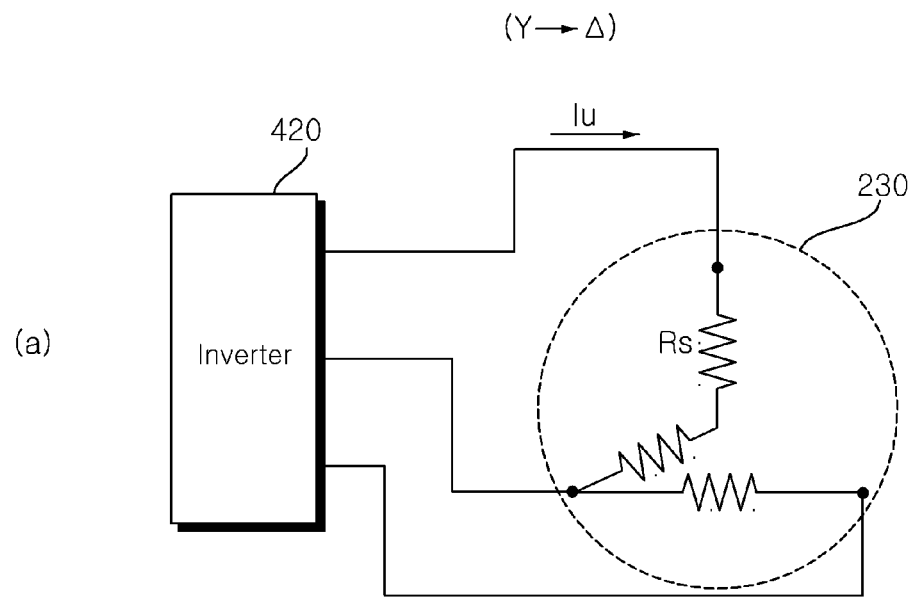
Figure 13C:
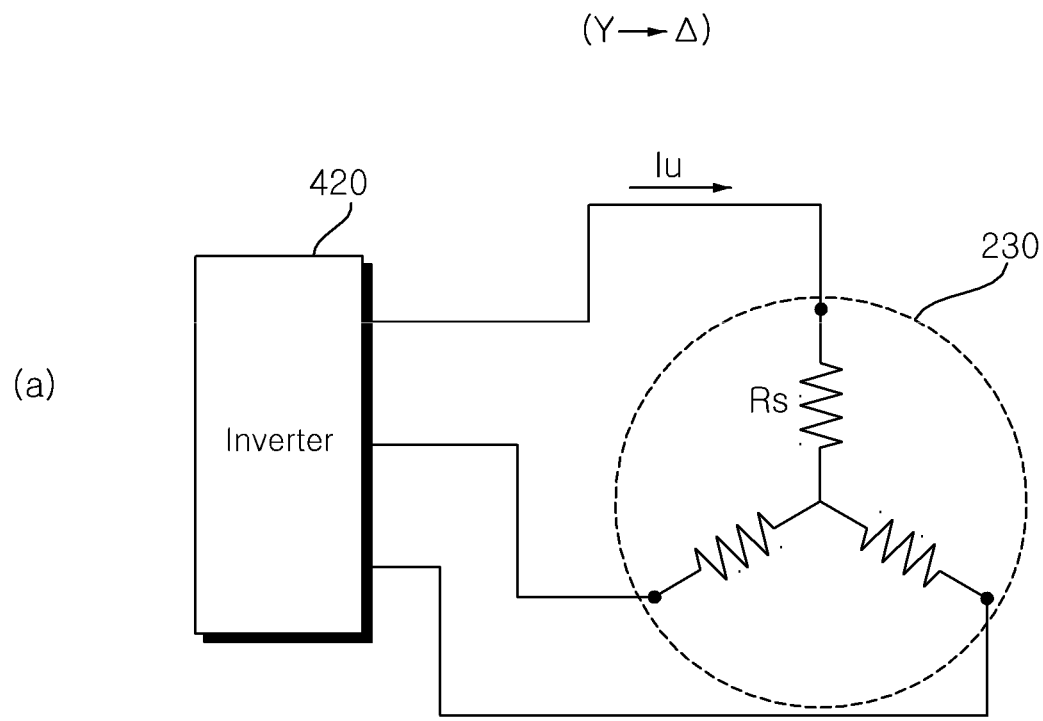

FIGS. 13A to 13C are diagrams showing the first winding resistance of each phase U, V, W, the second winding resistance of each phase U, V, W, and the ratio, in conversion from the first connection to the second connection.

First, FIG. 13A(a) illustrates an equivalent circuit diagram of the motor 230 when one relay of the switching device 450 operates abnormally.

Next, FIG. 13A(b) is a diagram showing the first winding resistance, the second winding resistance of each phase U, V, W, and the ratio, in the case of FIG. 13A(a).

Referring to the drawing, in the first connection, the winding resistance of the U phase, the winding resistance of the V phase, and the winding resistance of the W phase may be 0.97, 0.97, and 0.97Ω, respectively.

Meanwhile, in the second connection, the winding resistance of the U phase, the winding resistance of the V phase, and the winding resistance of the W phase may be 0.71, 0.41, and 0.72Ω, respectively.

In this regard, the U-phase winding resistance ratio, V-phase winding resistance ratio, and W-phase winding resistance ratio, which are ratios of winding resistance in the first connection to the second connection, may be 1.4, 2.4, and 1.4, respectively.

The controller 170 or the inverter controller 430 may determine that only the resistance ratio of V phase is normal, and the resistance ratio of U phase and W phase are abnormal, because the winding resistance ratio in the first connection to the second connection is within the third range which is a normal range only for the V phase.

Meanwhile, the controller 170 or the inverter controller 430 may determine that the operation in the first connection is normal, because the winding resistance of the U phase, the winding resistance of the V phase, and the winding resistance of the W phase in the first connection are all within the first range which is the normal range.

Meanwhile, the controller 170 or the inverter controller 430 may determine that the operation in the second connection is abnormal, because among the U phase winding resistance, V phase winding resistance, and W phase winding resistance in the second connection, it is within the second range which is the normal range only in the case of the V phase, and it deviates from the second range in the case of the U-phase and W-phase.

Accordingly, in the case of FIG. 13A(a), the controller 170 or the inverter controller 430 may control the switching device 450 to operate only in the first connection, not in the second connection.

FIG. 13B(a) illustrates an equivalent circuit diagram of the motor 230 when two relays of the switching device 450 operate abnormally.

Next, FIG. 13B(b) is a diagram showing the first winding resistance, the second winding resistance of each phase U, V, W, and the ratio, in the case of FIG. 13B(a).

Referring to the drawing, the winding resistance of the U phase, the winding resistance of the V phase, and the winding resistance of the W phase in the first connection may be 0.89, 0.89, and 0.905, respectively.

Meanwhile, in the second connection, the winding resistance of the U phase, the winding resistance of the V phase, and the winding resistance of the W phase may be 1.20, 0.47, and 0.645, respectively.

In this regard, the U-phase winding resistance ratio, V-phase winding resistance ratio, and W-phase winding resistance ratio, which are ratios of winding resistance in the first connection to the second connection, may be 0.7, 1.9, and 1.4, respectively.

The controller 170 or the inverter controller 430 may determine that the switching device 450 is abnormal, because the winding resistance ratio in the first connection with respect to the second connection deviates from the third range which is a normal range for all phases.

Meanwhile, the controller 170 or the inverter controller 430 may determine that the operation in the first connection is normal, because the winding resistance of the U phase, the winding resistance of the V phase, and the winding resistance of the W phase in the first connection are all within the first range which is the normal range.

Meanwhile, the controller 170 or the inverter controller 430 may determine that the operation in the second connection is abnormal, because among the U phase winding resistance, V phase winding resistance, and W phase winding resistance in the second connection, it is within the second range which is the normal range only in the case of the V phase, and it deviates from the second range in the case of U-phase and W-phase.

Accordingly, in the case of FIG. 13B(a), the controller 170 or the inverter controller 430 may control the switching device 450 to operate only in the first connection, not in the second connection.

FIG. 13C(a) illustrates an equivalent circuit diagram of the motor 230 when three relays of the switching device 450 operate abnormally.

Next, FIG. 13C(b) is a diagram showing the first winding resistance, the second winding resistance of each phase U, V, W, and the ratio, in the case of FIG. 13C(a). Referring to the drawing, in the first connection, the winding resistance of the U phase, the winding resistance of the V phase, and the winding resistance of the W phase may be 0.97, 0.97, and 0.97Ω, respectively.

Meanwhile, in the second connection, the winding resistance of the U phase, the winding resistance of the V phase, and the winding resistance of the W phase may be 0.96, 0.98, and 0.97Ω, respectively.

In this regard, the U-phase winding resistance ratio, V-phase winding resistance ratio, and W-phase winding resistance ratio, which are ratios of winding resistance in the first connection to the second connection, may be 1.0, 0.99, and 1.0, respectively.

The controller 170 or the inverter controller 430 may determine that the switching device 450 is abnormal, because the winding resistance ratio in the first connection with respect to the second connection deviates from the third range which is a normal range for all phases.

Meanwhile, the controller 170 or the inverter controller 430 may determine that the operation in the first connection is normal, because the winding resistance of the U phase, the winding resistance of the V phase, and the winding resistance of the W phase in the first connection are all within the first range which is the normal range.

Meanwhile, the controller 170 or the inverter controller 430 may determine that the operation in the second connection is abnormal, because the winding resistance of the U phase, the winding resistance of the V phase, and the winding resistance of the W phase in the second connection are all deviate from the second range which is the normal range.

Accordingly, in the case of FIG. 13C(a), the controller 170 or the inverter controller 430 may control the switching device 450 to operate only in the first connection, not in the second connection.

Figure 14A:
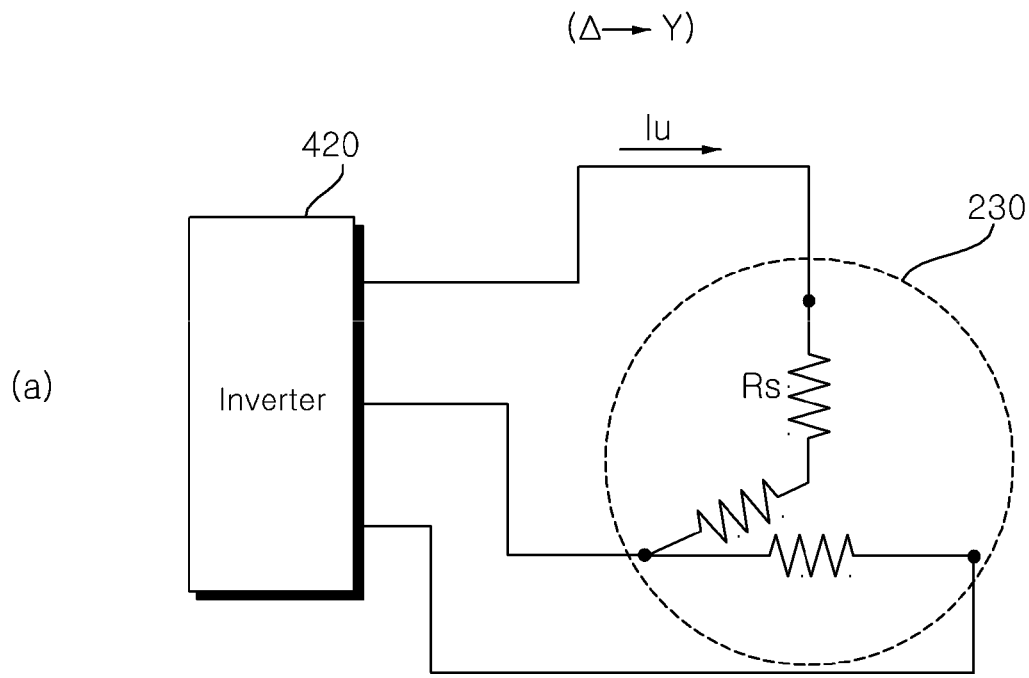
Figure 14B:
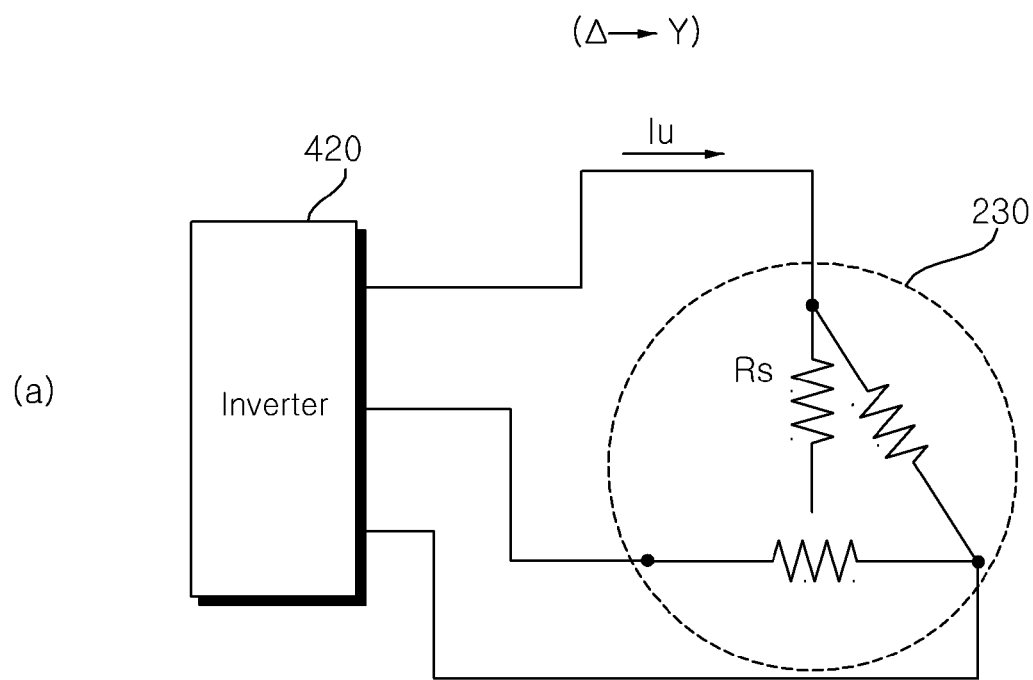
Figure 14C:
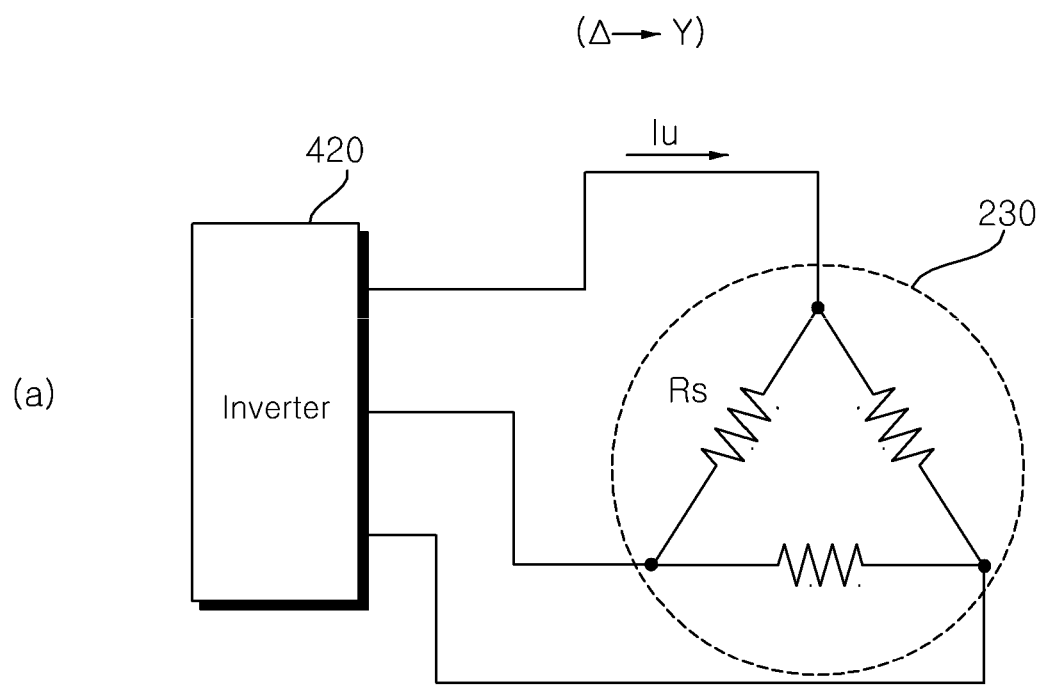

FIGS. 14A to 14C are a diagram showing the first winding resistance of each phase U, V, W, the second winding resistance of each phase U, V, W, and the ratio when converting from the second connection to the first connection.

First, FIG. 14A(a) illustrates an equivalent circuit diagram of the motor 230 when one relay of the switching device 450 operates abnormally.

Next, FIG. 14A(b) is a diagram showing the first winding resistance, the second winding resistance of each phase U, V, W, and the ratio, in the case of FIG. 14A(a).

Referring to the drawing, in the first connection, the winding resistance of the U phase, the winding resistance of the V phase, and the winding resistance of the W phase may be 1.23, 0.48, and 0.67Ω, respectively.

Meanwhile, in the second connection, the winding resistance of the U phase, the winding resistance of the V phase, and the winding resistance of the W phase may be 0.40, 0.40, and 0.405, respectively.

In this regard, the U-phase winding resistance ratio, V-phase winding resistance ratio, and W-phase winding resistance ratio, which are ratios of winding resistance in the first connection to the second connection, may be 3.1, 1.2, and 1.7, respectively.

The controller 170 or the inverter controller 430 may determine that the switching device 450 is abnormal, because the winding resistance ratio in the first connection with respect to the second connection deviates from the third range which is a normal range for all phases.

Meanwhile, the controller 170 or the inverter controller 430 may determine that the operation in the first connection is abnormal, because the winding resistance of the U phase, the winding resistance of the V phase, and the winding resistance of the W phase in the first connection are all deviate from the first range which is the normal range.

Meanwhile, the controller 170 or the inverter controller 430 may determine that the operation in the second connection is normal, because the winding resistance of the U phase, the winding resistance of the V phase, and the winding resistance of the W phase in the second connection are all within the second range which is the normal range.

Accordingly, in the case of FIG. 14A(a), the controller 170 or the inverter controller 430 may control the switching device 450 to operate only in the second connection, not in the first connection.

FIG. 14B(a) illustrates an equivalent circuit diagram of the motor 230 when two relays of the switching device 450 operate abnormally.

Next, FIG. 14B(b) is a diagram showing the first winding resistance, the second winding resistance of each phase U, V, W, and the ratio, in the case of FIG. 14B(a).

Referring to the drawing, the winding resistance of the U phase, the winding resistance of the V phase, and the winding resistance of the W phase in the first connection may be 0.68, 0.68, and 0.41Ω, respectively.

Meanwhile, in the second connection, the winding resistance of the U phase, the winding resistance of the V phase, and the winding resistance of the W phase may be 0.4, 0.4, and 0.41Ω, respectively.

In this regard, the U-phase winding resistance ratio, V-phase winding resistance ratio, and W-phase winding resistance ratio, which are ratios of winding resistance in the first connection to the second connection, may be 1.7, 1.7, and 1.0, respectively.

The controller 170 or the inverter controller 430 may determine that the switching device 450 is abnormal, because the winding resistance ratio in the first connection to the second connection deviates from the third range which is a normal range for all phases.

Meanwhile, the controller 170 or the inverter controller 430 may determine that the operation in the first connection is abnormal, because the winding resistance of the U phase, the winding resistance of the V phase, and the winding resistance of the W phase in the first connection are all deviate from the first range which is the normal range.

Meanwhile, the controller 170 or the inverter controller 430 may determine that the operation in the second connection is normal, because the winding resistance of the U phase, the winding resistance of the V phase, and the winding resistance of the W phase in the second connection are all within the second range which is the normal range.

Accordingly, in the case of FIG. 14B(a), the controller 170 or the inverter controller 430 may control the switching device 450 to operate only in the second connection, not in the first connection.

FIG. 14C(a) illustrates an equivalent circuit diagram of the motor 230 when three relays of the switching device 450 operate abnormally.

Next, FIG. 14C(b) is a diagram showing the first winding resistance, the second winding resistance of each phase U, V, W, and the ratio, in the case of FIG. 14C(a).

Referring to the drawing, the winding resistance of the U phase, the winding resistance of the V phase, and the winding resistance of the W phase in the first connection may be 0.39, 0.41, and 0.41Ω, respectively.

Meanwhile, in the second connection, the winding resistance of the U phase, the winding resistance of the V phase, and the winding resistance of the W phase may be 0.4, 0.4, and 0.41Ω, respectively.

In this regard, the U-phase winding resistance ratio, V-phase winding resistance ratio, and W-phase winding resistance ratio, which are ratios of winding resistance in the first connection to the second connection, may be 0.98, 1.0, and 1.0, respectively.

The controller 170 or the inverter controller 430 may determine that the switching device 450 is abnormal, because the winding resistance ratio in the first connection to the second connection deviates from the third range which is a normal range for all phases.

Meanwhile, the controller 170 or the inverter controller 430 may determine that the operation in the first connection is abnormal, because the winding resistance of the U phase, the winding resistance of the V phase, and the winding resistance of the W phase in the first connection are all deviate from the first range which is the normal range.

Meanwhile, the controller 170 or the inverter controller 430 may determine that the operation in the second connection is normal, because the winding resistance of the U phase, the winding resistance of the V phase, and the winding resistance of the W phase in the second connection are all within the second range which is the normal range.

Accordingly, in the case of FIG. 14C(a), the controller 170 or the inverter controller 430 may control the switching device 450 to operate only in the second connection, not in the first connection.

Figure 15:
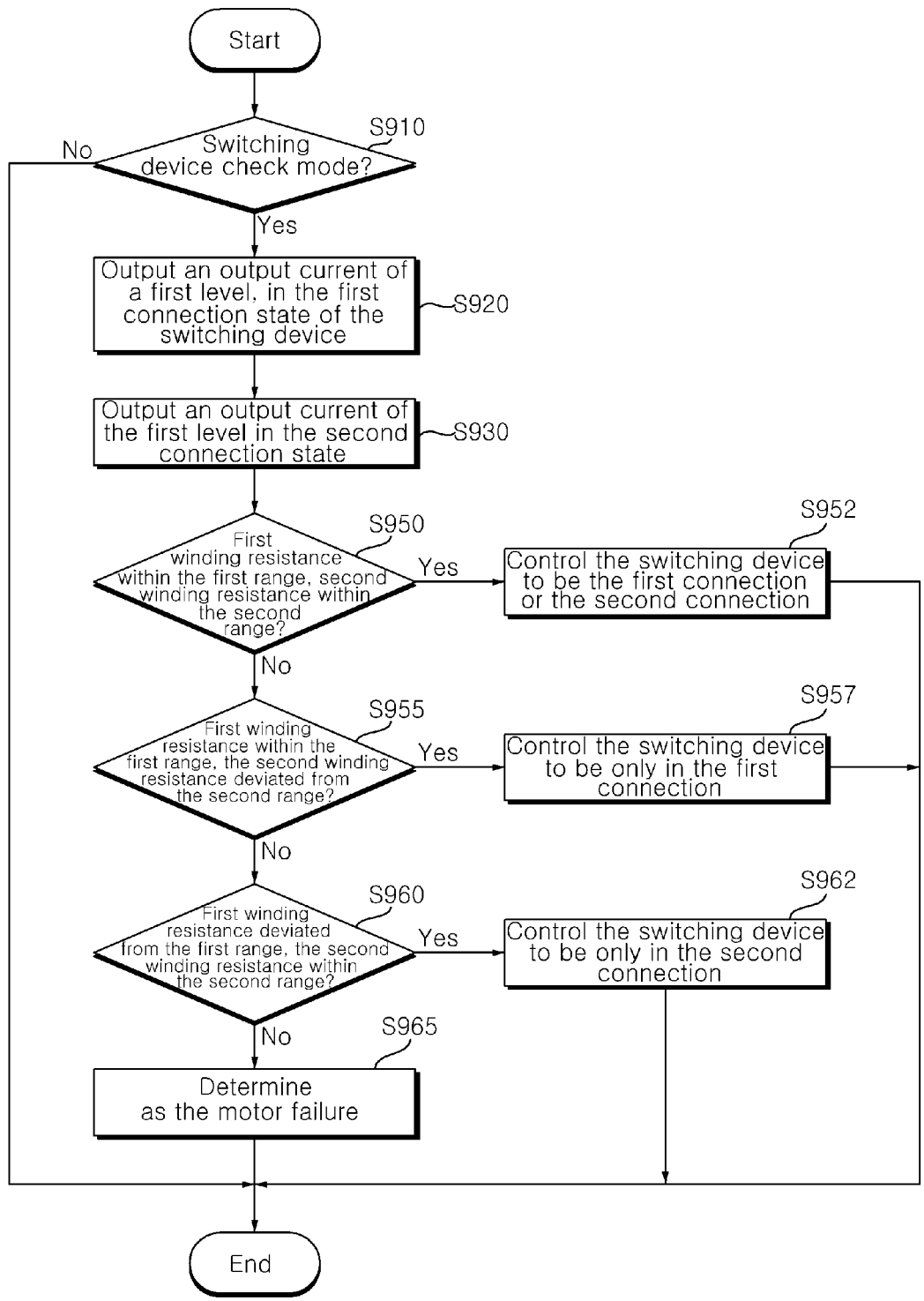
FIG. 15 is a flowchart illustrating a method of operating a motor driving device according to another embodiment of the present disclosure.
Figure 16A:
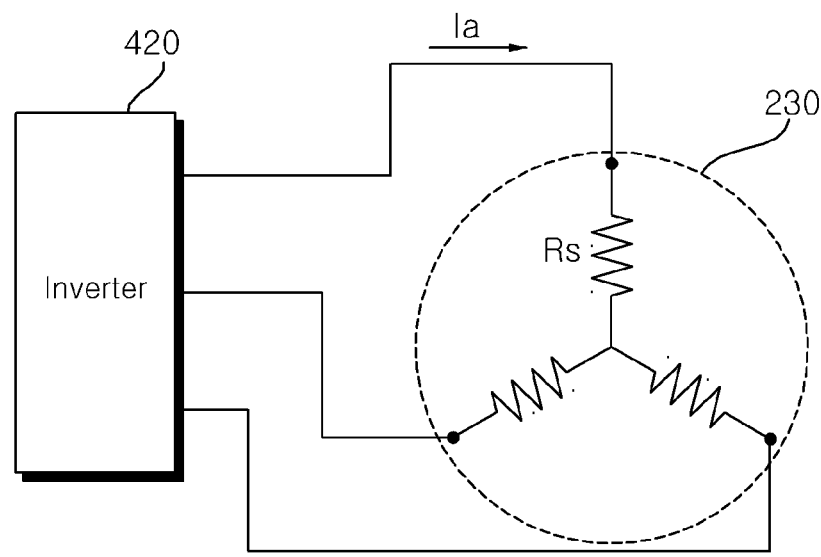
FIGS. 16A to 16C are diagrams for explaining the operation of FIG. 15.
Figure 16A:
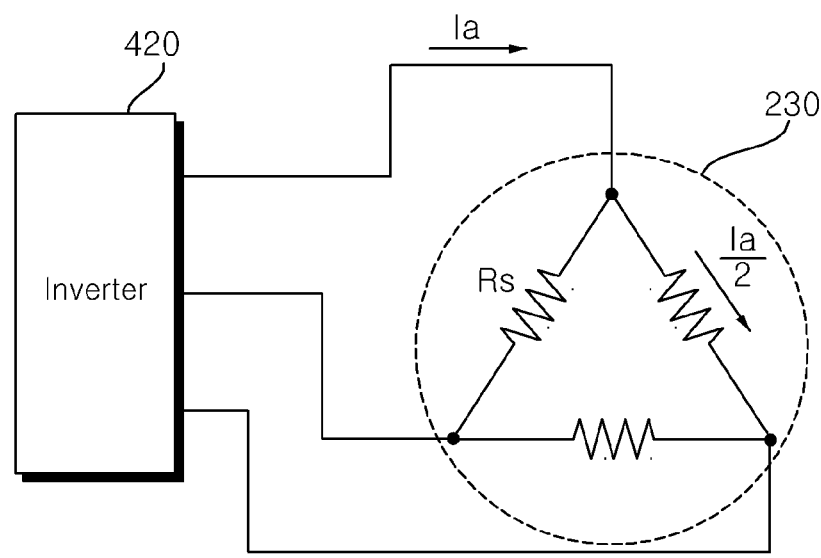
Figure 16B:
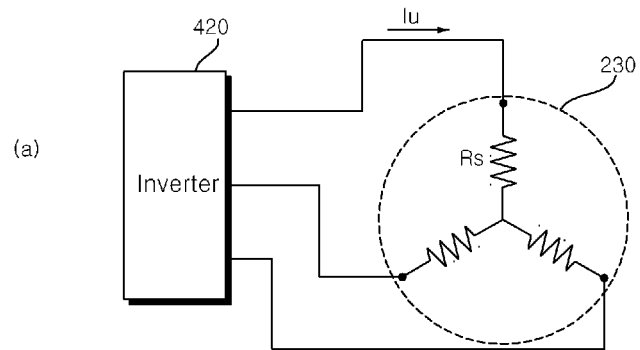
Figure 16B:
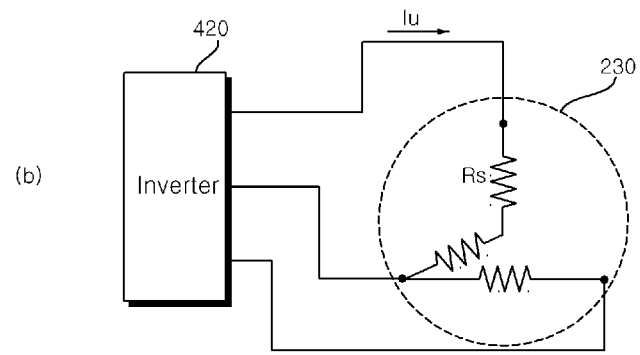
Figure 16B:
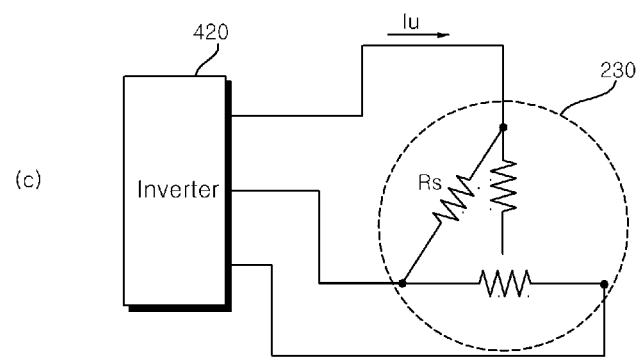
Figure 16C:
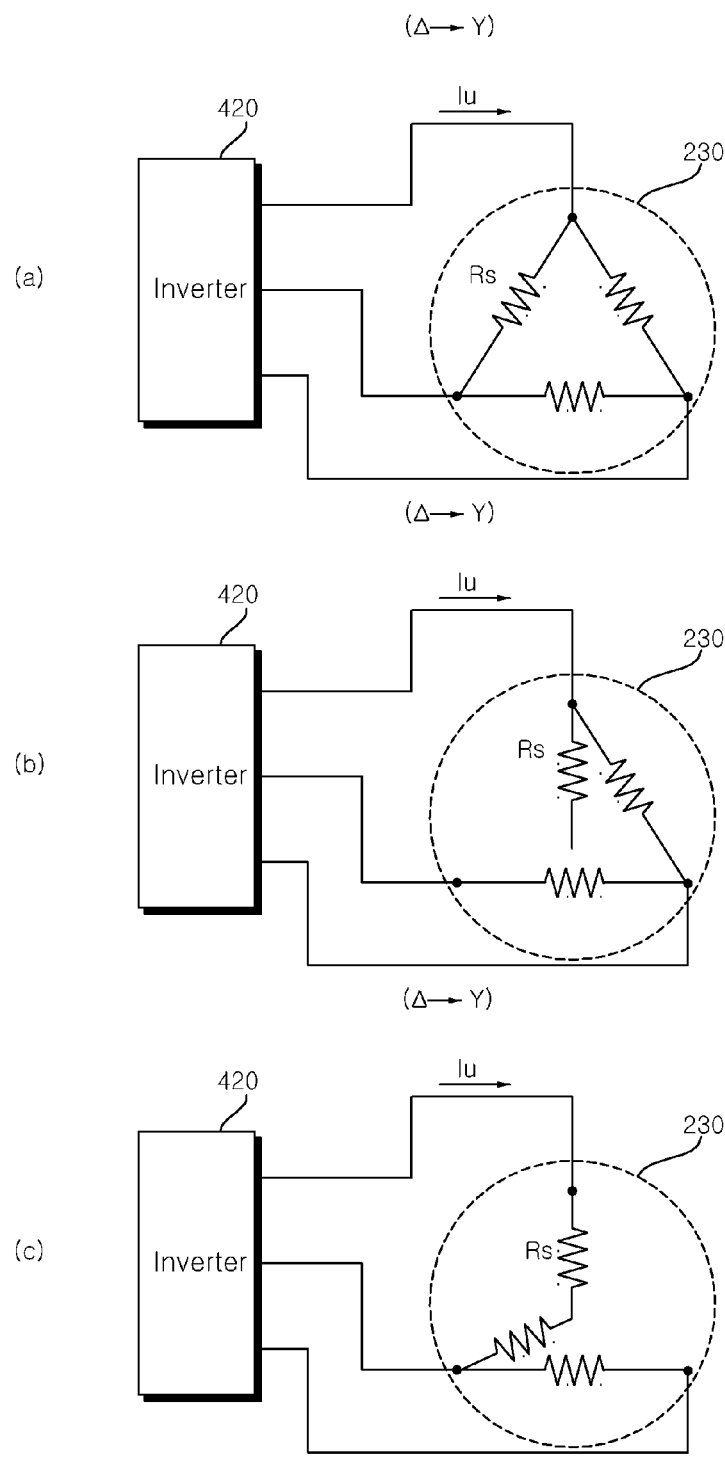

FIG. 15 is a flowchart illustrating a method of operating a motor driving device according to another embodiment of the present disclosure, and FIGS. 16A to 16C are diagrams for explaining the operation of FIG. 15.

Referring to FIG. 15, the operation method of FIG. 15 is similar to the operation method of FIG. 9A, but there is a difference in that after step 930 (S930), step 950 (S950) to step 965 (S965) are further performed.

Accordingly, step 910 (S910), step 920 (S920), and step 930 (S930) refer to the description of FIG. 9A.

Meanwhile, in the drawing, only step 910 (S910), step 920 (S920), and step 930 (S930) are shown, but the present disclosure is not limited thereto, and after step 910 (S910), step 920 (S920), step 922 (S922), step 930 (S930), step 932 (S932) of FIG. 9B are performed, step 950 (S950) can be performed.

Meanwhile, the controller 170 or the inverter controller 430 calculates the first winding resistance in the first connection and the second winding resistance in the second connection. In particular, the first winding resistance in the first connection and the second winding resistance in the second connection may be calculated for each phase U, V, W.

Next, the controller 170 or the inverter controller 430 determines whether the first winding resistance is within the first range and the second winding resistance is within the second range (S950).

As described above, the first range may be 0.7 to 1.2, and the second range may be 0.3 to 0.6.

Next, when the first winding resistance is within the first range, and the second winding resistance is within the second range, the controller 170 or the inverter controller 430 may control the switching device to convert the winding of the motor 230 from the first connection to the second connection according to the operation frequency of the motor 230 (S952).

Accordingly, when the switching device 450 operates normally, the power conversion efficiency or the driving efficiency of motor 230 can be increased.

Meanwhile, the controller 170 or the inverter controller 430 may control the motor 230 to continuously operate without stopping, while the switching device 450 converts the winding of the motor 230 from the first connection to the second connection. As described above, since the motor 230 does not stop during the switching operation of the switching device 450, the operating efficiency of the motor 230 can be improved.

Meanwhile, the controller 170 or the inverter controller 430 may control the operation frequency of the motor 230 to fall from a first frequency to a second frequency and then rise again, while the switching device 450 converts the winding of the motor 230 from the first connection to the second connection. As described above, since the motor 230 does not stop during the switching operation of the switching device 450, the operating efficiency of the motor 230 can be improved.

Meanwhile, if step 950 (S950) is not satisfied, the controller 170 or the inverter controller 430 determines whether the first winding resistance is within the first range, and the second winding resistance deviates from the second range (S955).

In addition, when the first winding resistance is within the first range and the second winding resistance deviates from the second range, the controller 170 or the inverter controller 430 may control the switching device 450 to operate only in the first connection not in the second connection (S957). Thus, the emergency operation of the motor 230 can be achieved by operating only in one connection state when the switching device 450 is abnormal.

Meanwhile, if step 955 (S955) is not satisfied, the controller 170 or the inverter controller 430 determines whether the first winding resistance deviates from the first range and the second winding resistance is within the second range (S960).

In addition, when the first winding resistance deviates from the first range and the second winding resistance is within the second range, the controller 170 or the inverter controller 430 may control the switching device 450 to operate only in the second connection not in the first connection (S957). Thus, when the switching device 450 is abnormal, the emergency operation of the motor 230 can be achieved by operating only in one connection state.

Meanwhile, if step 960 (S960) is not satisfied, the controller 170 or the inverter controller 430 may determine that the first winding resistance deviates from the first range and the second winding resistance deviates from the second range, and may determine as a failure of the motor 230 (S965). Accordingly, it is possible to easily determine whether the motor 230 has failed.

In addition, the controller 170 or the inverter controller 430 stops the operation of the inverter 420 as well as the operation of the motor 230 when the motor 230 fails, thereby preventing damage to a circuit element in the motor driving device 220.

FIG. 16A illustrates various examples of an equivalent circuit diagram of the motor 230, when the first winding resistance is within the first range and the second winding resistance is within the second range.

FIG. 16A(a) shows an equivalent circuit diagram of the motor 230 of the first connection which is a Y connection, and FIG. 16A(b) shows an equivalent circuit diagram of the motor 230 of the second connection which is a Δ connection.

As in step 952 (S952) in FIG. 15, the controller 170 or the inverter controller 430 may control to vary between the first connection and the second connection according to the operation frequency of the motor 230.

FIG. 16B illustrates various examples of an equivalent circuit diagram of the motor 230, when the first winding resistance is within the first range and the second winding resistance deviates from the second range.

FIG. 16B(a), as in FIG. 13c, corresponds to a case in which three relay elements are abnormal, FIG. 16B(b), as in FIG. 13b, corresponds to a case in which two relay elements are abnormal, and FIG. 16B(c), as in FIG. 13A, corresponds to a case in which one relay element is abnormal.

Accordingly, in the case of FIG. 16B, the controller 170 or the inverter controller 430 may control the switching device 450 to operate only in the first connection and not to operate in the second connection.

FIG. 16C illustrates various examples of an equivalent circuit diagram of the motor 230, when the first winding resistance deviates from the first range and the second winding resistance is within the second range.

FIG. 16C(a), as in FIG. 13C, corresponds to a case in which three relay elements are abnormal, FIG. 16C(b), as in FIG. 13B, corresponds to a case in which two relay elements are abnormal, and FIG. 16C(c), as in FIG. 13A, corresponds to a case in which one relay element is abnormal.

Accordingly, in the case of FIG. 16C, the controller 170 or the inverter controller 430 may control the switching device 450 to operate only in the second connection and not to operate in the first connection.

Meanwhile, in the present disclosure, in order to prevent a failure due to deterioration of the life of the switching device 450 due to repeated use of the switching device 450, an operation of limiting the connection conversion may be performed.

Specifically, in the second connection state, when the number of low-speed abnormal operation in which the operation frequency of the motor 230 is operated at a limit frequency or less exceeds a first threshold value within a certain time, the controller 170 may limit the connection conversion of the winding of the motor 230. Accordingly, the switching device 450 is not overloaded, and failure of the switching device 450 is prevented. Here, the certain time may be a preset time.

Here, limiting the connection conversion of the winding of the motor 230 means that the switching device 450 does not switch to the first connection or the second connection, but maintains the second connection state.

The controller 170 may allow the connection conversion of the winding of motor 230, after a first time is elapsed, in a state in which the conversion of the connection state of the winding of motor 230 is limited. The controller 170 may initialize an accumulated value for the number of low-speed abnormal operation, after the first time is elapsed, in a state in which the conversion of the connection state of the winding of motor 230 is limited. The efficiency of the compressor can be improved by allowing the connection conversion again, after a certain time is elapsed, rather than indefinitely maintaining the limit on the conversion of the connection state.

At a limit frequency, the output current value in the first connection state may be smaller than the output current value in the second connection state. At the limit frequency, the output current value in the first connected state may be smaller than $1/\sqrt{3}$ times the maximum value of the output current in the second connection state.

In addition, the limit frequency can be defined as a frequency when the output current value in the first connection state is smaller than the output current value in the second connection state, and the output current value in the first connection state is smaller than $1/\sqrt{3}$ times of the maximum value of the output current in the second connection state.

In the second connection state, when the number of low-speed abnormal operations in which the operation frequency of the motor 230 is operated at the limit frequency or lower is less than a first threshold value within a certain time, the controller 170 may convert the winding of the motor 230 into the first connection or the second connection according to the operation frequency of the motor 230.

Specifically, in the second connection state, when the number of low-speed abnormal operations in which the operation frequency of the motor 230 is operated at the limit frequency or lower is less than the first threshold value within a certain time, the controller 170 may controls the winding of the motor 230 to be in the first connection state when the operation frequency of the motor 230 is less than or equal to a first operation frequency, and may controls the winding of the motor 230 to be in the second connection state when the operation frequency of the motor 230 exceeds the first operation frequency.

As another example, in the second connection state, when the number of low-speed abnormal operations in which the operation frequency of the motor 230 is operated at the limit frequency or lower is less than the first threshold value within a certain time, the controller 170 may convert the winding of the motor 230 into the first connection or the second connection according to the operation speed of the motor 230.

Specifically, in the second connection state, when the number of low-speed abnormal operations in which the operation frequency of the motor 230 is operated at the limit frequency or lower is less than the first threshold value within a certain time, the controller 170 may controls the winding of the motor 230 to be in the first connection state when the operation frequency of the motor 230 is less than or equal to a first operation speed, and may controls the winding of the motor 230 to be in the second connection state when the operation frequency of the motor 230 exceeds the first operation speed.

Hereinafter, an operation method of the motor 230 driving device for limiting the connection conversion will be described with reference to FIG. 17.

Figure 17:
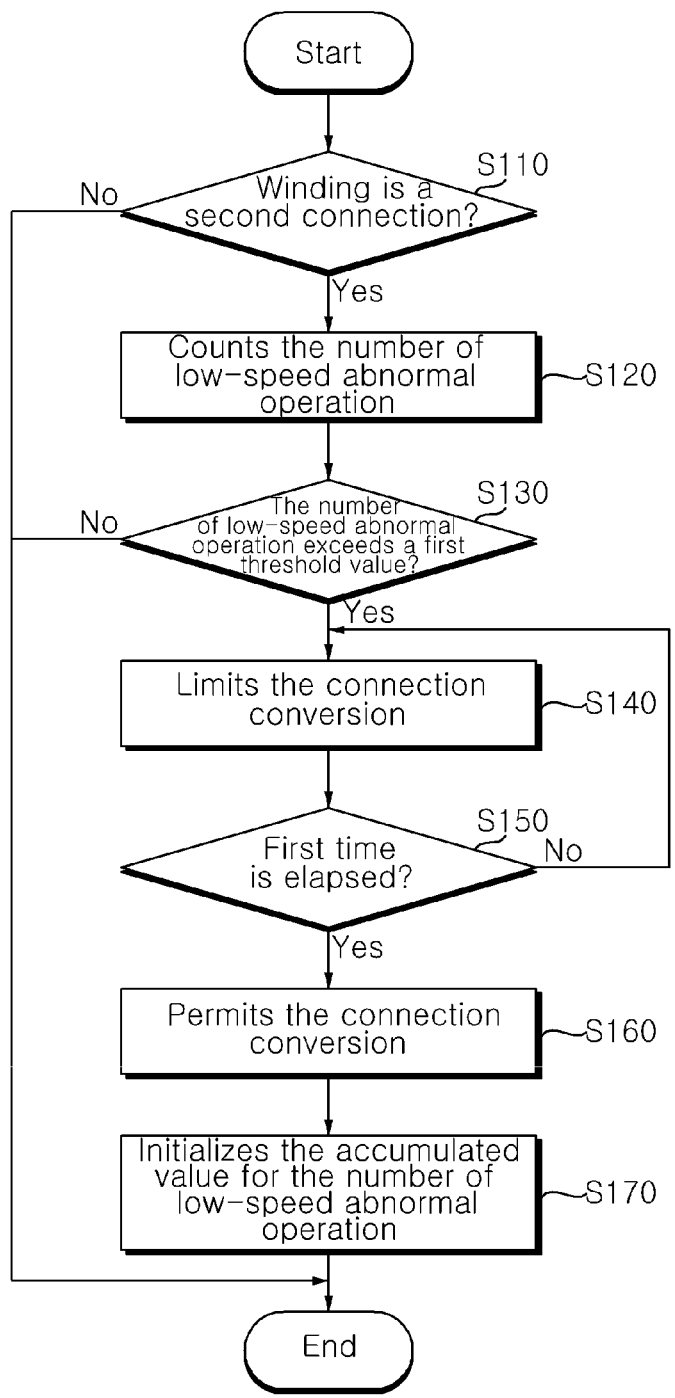
FIG. 17 is a flowchart illustrating a method of operating a motor driving device according to another embodiment of the present disclosure.

FIG. 17 is a flowchart illustrating a method of operating the motor 230 driving device according to another embodiment of the present disclosure. FIG. 17 shows the operation of limiting the connection conversion.

Referring to FIG. 17, in the operation method of FIG. 17, step 160 (S160) and step 170 (S170) may be performed in reverse order.

First, the controller 170 determines whether the winding of the motor 230 is in a second connection state (S110). When it is determined that the winding of the motor 230 is not in the second connection state, the controller 170 terminates the execution of the connection conversion limit operation.

Thereafter, when it is determined that the winding of the motor 230 is in the second connection state, the controller 170 counts the number of low-speed abnormal operation (S120).

Thereafter, the controller 170 determines whether the number of low-speed abnormal operation exceeds a first threshold value within a certain time (S130). The controller 170 limits the connection conversion of the winding of the motor 230, when the number of low-speed abnormal operations in which the operation frequency of the motor 230 is operated at the limit frequency or lower within a certain time exceeds the first threshold value (S140). Obviously, the controller 170 permits the connection conversion of the winding of the motor 230, when the number of the low-speed abnormal operation does not exceed the first threshold value within a certain time.

Thereafter, the controller 170 determines whether a first time is elapsed, in the state where the conversion of the connection state of the winding of the motor 230 is limited (S150).

Thereafter, when it is determined that the first time is elapsed, the controller 170 permits the connection conversion of the winding of the motor 230 (S160).

Thereafter, when it is determined that the first time is elapsed, the controller 170 initializes the accumulated value for the number of low-speed abnormal operation (S170).

Meanwhile, the motor driving device 220 according to the embodiment of the present disclosure described with reference to FIGS. 4 to 17 is applicable to various home appliances in addition to the air conditioner 100 of FIG. 1. For example, it can be applied in various fields such as laundry treatment apparatus (washing machine, dryer, etc.), refrigerator, water purifier, robot cleaner, robot, vehicle, drone, and the like.

Meanwhile, the operating method of the motor driving device or the air conditioner of the present disclosure can be implemented as a processor readable code on a processor readable recording medium provided in the motor driving device or the air conditioner. The processor-readable recording medium includes all types of recording devices in which data readable by the processor is stored. Examples of the processor-readable recording medium include ROM, RAM, CD-ROM, magnetic tape, floppy disk, optical data storage device, etc., and also includes those implemented in the form of carrier waves such as transmission over the Internet. In addition, the processor-readable recording medium can be distributed in a computer system connected by a network, so that the processor-readable code can be stored and executed in a distributed manner.

The motor driving device and the air conditioner having the same according to an embodiment of the present disclosure limits the connection conversion of the winding of the motor, when the number of low-speed abnormal operation in which the operation frequency of the motor is operated at the limit frequency or lower exceeds the first threshold value within a certain time, in the second connection state, thereby preventing a situation in which the switching device is used repeatedly, and preventing deterioration of life and failure caused by the repeated use of the switching device.

In addition, since the present disclosure determines only the number of low-speed abnormal operation in order to determine the connection conversion limitation, the control burden on the controller is reduced, rapid control is possible, and deterioration of the performance of the air conditioner can be prevented.

According to the present disclosure, it is possible to determine whether there is an abnormality in the switching device for converting the motor connection, so that the abnormality of the switching device can be recognized quickly, and it is possible to prevent the failure of other devices of air conditioner due to the failure of the switching device.

In addition, the present disclosure determines the abnormal operation of the switching device based on the winding resistance of the motor in the first connection and the winding resistance of the motor in the second connection, thereby easily determining whether the switching device is abnormal, based on the resistance.

While the present disclosure has been particularly shown and described with reference to exemplary embodiments thereof, it will be understood by those of ordinary skill in the art that various changes in form and detail may be made herein without departing from the spirit and scope of the present disclosure as defined by the following claims and such modifications and variations should not be understood individually from the technical idea or aspect of the present disclosure.

What is claimed is:

1. A motor driving device comprising:
   an inverter that includes a plurality of switching devices and is configured to output alternating current (AC) power to a motor based on a switching operation;
   a switching device that is disposed between the inverter and the motor and is configured to switch windings of the motor to a first connection state or a second connection state;
   a controller configured to control the inverter and the switching device; and
   an output current detection unit configured to detect an output current from the inverter,
   wherein the controller is configured to, based on a number of low-speed abnormal operations exceeding a first threshold value within a time period, and based on the windings of the motor being in the second connection state, restrict the windings of the motor from being switched to the first connection state,
   wherein the controller is configured to determine the number of low-speed abnormal operations in which the motor is operated at an operation frequency that is equal to or lower than a limit frequency, and
   wherein at the limit frequency, the output current in the first connection state is smaller than the output current in the second connection state.

2. The motor driving device of claim 1, wherein the controller is configured to, based on the windings of the motor being restricted from switching during a first time period, cause the windings of the motor to be switched.

3. The motor driving device of claim 1, wherein the controller is configured to, based on the windings of the motor being restricted from switching during a first time period, initialize the number of low-speed abnormal operations.

4. The motor driving device of claim 1, the output current detection unit is configured to detect the output current from the inverter,
   wherein at the limit frequency, the output current in the first connection state is smaller than $1/\sqrt{3}$ times a maximum value of the output current in the second connection state.

5. The motor driving device of claim 1, wherein the controller is configured to, based on the operation frequency of the motor being lower than or equal to a first operation frequency, control the windings of the motor to be in the first connection state.

6. The motor driving device of claim 1, wherein the controller is configured to, based on the operation frequency exceeding a first operation frequency, control the windings of the motor to be in the second connection state.

7. The motor driving device of claim 1, wherein the controller is configured to control the motor to operate continuously without stopping while the windings of the motor are switched from the first connection state to the second connection state.

8. The motor driving device of claim 1,
   wherein the controller is configured to, based on being in a switching device check mode, (i) control the inverter to output an output current of a first level during a first period in which the windings of the motor are in the first connection state, and (ii) control the inverter to output the output current of the first level during a second period after the first period in which the windings of the motor are in the second connection state.

9. The motor driving device of claim 1, wherein the controller is configured to, based on a winding resistance of the motor in the first connection state and a winding resistance of the motor in the second connection state, determine whether the switching device is operating abnormally.

10. The motor driving device of claim 9, wherein the controller is configured to:
    (i) calculate a first winding resistance and a second winding resistance for each period,
    (ii) based on a range of the first winding resistance for each period deviating from a first range and a range of the second winding resistance for each period deviating from a second range, determine a failure of the motor,
    (iii) based on the range of the first winding resistance for each period being within the first range, and the range of the second winding resistance for each period being within the second range, determine that the switching device is normal, and
    (iv) control the switching device to switch the windings of the motor from the first connection to the second connection according to the operation frequency of the motor.

11. A motor driving device comprising:
    an inverter that includes a plurality of switching devices and is configured to output alternating current (AC) power to a motor based on a switching operation;
    a switching device that is disposed between the inverter and the motor and is configured to switch windings of the motor to a first connection state or a second connection state; and
    a controller configured to control the inverter and the switching device,
    wherein the controller is configured to, based on a number of low-speed abnormal operations exceeding a first threshold value within a time period, and based on the windings of the motor being in the second connection state, restrict the windings of the motor from being switched to the first connection state,
    wherein the controller is configured to determine the number of low-speed abnormal operations in which the motor is operated at an operation frequency that is equal to or lower than a limit frequency, and
    wherein the controller is configured to, based on the number of low-speed abnormal operations being less than the first threshold value within the time period in the second connection state, convert the windings of the motor into the first connection state or the second connection state according to the operation frequency of the motor.

12. A motor driving device comprising:
    an inverter that includes a plurality of switching devices and is configured to output alternating current (AC) power to a motor based on a switching operation;
    a switching device that is disposed between the inverter and the motor and is configured to switch windings of the motor to a first connection state or a second connection state; and
    a controller configured to control the inverter and the switching device,
    wherein the controller is configured to, based on a number of low-speed abnormal operations exceeding a first threshold value within a time period, and based on the windings of the motor being in the second connection state, restrict the windings of the motor from being switched to the first connection state, wherein the controller is configured to determine the number of low-speed abnormal operations in which the motor is operated at an operation frequency that is equal to or lower than a limit frequency, and wherein the controller is configured to, based on the number of low-speed abnormal operations being less than the first threshold value within the time period in the second connection state, convert the windings of the motor into the first connection state or the second connection state according to an operation speed of the motor.

13. The motor driving device of claim 12, wherein the controller is configured to, based on the operation frequency of the motor being lower than or equal to a first speed, control the windings of the motor to be in the first connection state.

14. The motor driving device of claim 12, wherein the controller is configured to, based on the operation frequency of the motor exceeding a first speed, control the windings of the motor to be in the second connection state.

15. A motor device comprising:

An inverter that includes a plurality of switching devices and is configured to output AC power to a motor based on a switching operation;

a switching device that is disposed between the inverter and the motor, and configured to switch windings of the motor to a first connection state or a second connection state;

an output current detection unit configured to detect an output current of the motor;

a controller configured to control the inverter and the switching device, wherein the controller is configured to, based on a number of low-speed abnormal operations exceeding a first threshold value within a time period, maintain the second connection state, wherein the controller is configured to determine the number of low-speed abnormal operations in which the motor is operated at an operation frequency that is equal to or lower than a limit frequency, wherein at the limit frequency, the output current in the first connection state is smaller than the output current in the second connection state.

16. The motor driving device of claim 15, wherein the controller is configured to, based on the second connection state being maintained during a first time period, cause a connection conversion of the motor winding.

17. The motor driving device of claim 15, wherein the controller is configured to, based on the second connection state being maintained during a first time period, initialize the number of low-speed abnormal operations.

* * * * *